United States Patent
Davison et al.

(10) Patent No.: US 8,331,740 B2
(45) Date of Patent: Dec. 11, 2012

(54) INFERENTIAL SELF-REGISTRATION OF IMPERFECT OMR FORMS

(75) Inventors: Owen C. Davison, Honey Brook, PA (US); Victor F. Berutti, Downingtown, PA (US); Bruce D. Holenstein, Media, PA (US); Paul J. Holenstein, Downingtown, PA (US); Tristan E. Hoffmann, Exton, PA (US)

(73) Assignee: Gravic, Inc., Malvern, PA (US)

( * ) Notice: Subject to any disclaimer, the term of this patent is extended or adjusted under 35 U.S.C. 154(b) by 990 days.

(21) Appl. No.: 12/265,404

(22) Filed: Nov. 5, 2008

(65) Prior Publication Data

US 2009/0116748 A1     May 7, 2009

Related U.S. Application Data

(60) Provisional application No. 60/985,736, filed on Nov. 6, 2007.

(51) Int. Cl.
*G06K 7/10* (2006.01)
*G06K 13/00* (2006.01)
*H04N 1/04* (2006.01)

(52) U.S. Cl. .................... 382/321; 358/474; 235/386

(58) Field of Classification Search .............. 382/113, 382/321, 323, 190–209; 235/375, 386, 432, 235/454, 456; 358/474
See application file for complete search history.

(56) References Cited

U.S. PATENT DOCUMENTS

| | | | | |
|---|---|---|---|---|
| 5,672,060 | A * | 9/1997 | Poor | 434/322 |
| 6,741,738 | B2 * | 5/2004 | Taylor | 382/187 |
| 6,961,482 | B2 | 11/2005 | Knowles | |
| 7,306,149 | B2 * | 12/2007 | DeBiase, Jr. | 235/386 |
| 7,573,616 | B2 * | 8/2009 | Poor | 358/474 |
| 7,911,660 | B2 * | 3/2011 | Poor | 358/474 |
| 2004/0121298 | A1 * | 6/2004 | Creamer et al. | 434/322 |

OTHER PUBLICATIONS

Remark Office OMR®, Version 6, User's Guide, Copyright © 2005, Principia Products, a division of Gravic, Inc., 352 pages.

* cited by examiner

*Primary Examiner* — Chan S Park
*Assistant Examiner* — Ha Le
(74) *Attorney, Agent, or Firm* — Panitch Schwarze Belisario & Nadel LLP

(57) ABSTRACT

Image data of a zone in a response form that has a plurality of response bubbles in the zone is processed. The image data of the zone has at least one response bubble that is well-formed and at least one response bubble that is not well-formed. Well-formed response bubbles are located in the zone from image data of the zone. The locations of the well-formed response bubbles in the zone are compared to a form template that defines the zone and contains data regarding locations of all expected response bubbles in the zone. It is determined from the comparison whether sufficient information exists to determine that the well-formed response bubbles constitute a specific part of the form template zone. If so, then the well-formed response bubbles are processed from the image data of the zone.

13 Claims, 30 Drawing Sheets

Sample Traditional OMR Form

What is your family's annual income?

- ○ Under $30,000
- ○ $30,001 to $80,000
- ○ $80,001 to $200,000
- ○ Over $200,000

(a)

Employee ID

⓪⓪⓪⓪⓪
①①①①①
②②②②②
③③③③③
④④④④④
⑤⑤⑤⑤⑤
⑥⑥⑥⑥⑥
⑦⑦⑦⑦⑦
⑧⑧⑧⑧⑧
⑨⑨⑨⑨⑨

(b)

21 Ⓐ Ⓑ Ⓒ Ⓓ Ⓔ
22 Ⓐ Ⓑ Ⓒ Ⓓ Ⓔ
23 Ⓐ Ⓑ Ⓒ Ⓓ Ⓔ

(c)

Sample OMR Questions
Figure 2
(Prior Art)

GENERAL ANSWER SHEET

NAME

CLASS

SUBJECT

INDEX NUMBER

START

| | | | | |
|---|---|---|---|---|
| 01 Ⓐ Ⓑ Ⓒ Ⓓ Ⓔ | 26 Ⓐ Ⓑ Ⓒ Ⓓ Ⓔ | 51 Ⓐ Ⓑ Ⓒ Ⓓ Ⓔ | 76 Ⓐ Ⓑ Ⓒ Ⓓ Ⓔ |
| 02 Ⓐ Ⓑ Ⓒ Ⓓ Ⓔ | 27 Ⓐ Ⓑ Ⓒ Ⓓ Ⓔ | 52 Ⓐ Ⓑ Ⓒ Ⓓ Ⓔ | 77 Ⓐ Ⓑ Ⓒ Ⓓ Ⓔ |
| 03 Ⓐ Ⓑ Ⓒ Ⓓ Ⓔ | 28 Ⓐ Ⓑ Ⓒ Ⓓ Ⓔ | 53 Ⓐ Ⓑ Ⓒ Ⓓ Ⓔ | 78 Ⓐ Ⓑ Ⓒ Ⓓ Ⓔ |
| 04 Ⓐ Ⓑ Ⓒ Ⓓ Ⓔ | 29 Ⓐ Ⓑ Ⓒ Ⓓ Ⓔ | 54 Ⓐ Ⓑ Ⓒ Ⓓ Ⓔ | 79 Ⓐ Ⓑ Ⓒ Ⓓ Ⓔ |
| 05 Ⓐ Ⓑ Ⓒ Ⓓ Ⓔ | 30 Ⓐ Ⓑ Ⓒ Ⓓ Ⓔ | 55 Ⓐ Ⓑ Ⓒ Ⓓ Ⓔ | 80 Ⓐ Ⓑ Ⓒ Ⓓ Ⓔ |
| 06 Ⓐ Ⓑ Ⓒ Ⓓ Ⓔ | 31 Ⓐ Ⓑ Ⓒ Ⓓ Ⓔ | 56 Ⓐ Ⓑ Ⓒ Ⓓ Ⓔ | 81 Ⓐ Ⓑ Ⓒ Ⓓ Ⓔ |
| 07 Ⓐ Ⓑ Ⓒ Ⓓ Ⓔ | 32 Ⓐ Ⓑ Ⓒ Ⓓ Ⓔ | 57 Ⓐ Ⓑ Ⓒ Ⓓ Ⓔ | 82 Ⓐ Ⓑ Ⓒ Ⓓ Ⓔ |
| 08 Ⓐ Ⓑ Ⓒ Ⓓ Ⓔ | 33 Ⓐ Ⓑ Ⓒ Ⓓ Ⓔ | 58 Ⓐ Ⓑ Ⓒ Ⓓ Ⓔ | 83 Ⓐ Ⓑ Ⓒ Ⓓ Ⓔ |
| 09 Ⓐ Ⓑ Ⓒ Ⓓ Ⓔ | 34 Ⓐ Ⓑ Ⓒ Ⓓ Ⓔ | 59 Ⓐ Ⓑ Ⓒ Ⓓ Ⓔ | 84 Ⓐ Ⓑ Ⓒ Ⓓ Ⓔ |
| 10 Ⓐ Ⓑ Ⓒ Ⓓ Ⓔ | 35 Ⓐ Ⓑ Ⓒ Ⓓ Ⓔ | 60 Ⓐ Ⓑ Ⓒ Ⓓ Ⓔ | 85 Ⓐ Ⓑ Ⓒ Ⓓ Ⓔ |
| 11 Ⓐ Ⓑ Ⓒ Ⓓ Ⓔ | 36 Ⓐ Ⓑ Ⓒ Ⓓ Ⓔ | 61 Ⓐ Ⓑ Ⓒ Ⓓ Ⓔ | 86 Ⓐ Ⓑ Ⓒ Ⓓ Ⓔ |
| 12 Ⓐ Ⓑ Ⓒ Ⓓ Ⓔ | 37 Ⓐ Ⓑ Ⓒ Ⓓ Ⓔ | 62 Ⓐ Ⓑ Ⓒ Ⓓ Ⓔ | 87 Ⓐ Ⓑ Ⓒ Ⓓ Ⓔ |
| 13 Ⓐ Ⓑ Ⓒ Ⓓ Ⓔ | 38 Ⓐ Ⓑ Ⓒ Ⓓ Ⓔ | 63 Ⓐ Ⓑ Ⓒ Ⓓ Ⓔ | 88 Ⓐ Ⓑ Ⓒ Ⓓ Ⓔ |
| 14 Ⓐ Ⓑ Ⓒ Ⓓ Ⓔ | 39 Ⓐ Ⓑ Ⓒ Ⓓ Ⓔ | 64 Ⓐ Ⓑ Ⓒ Ⓓ Ⓔ | 89 Ⓐ Ⓑ Ⓒ Ⓓ Ⓔ |
| 15 Ⓐ Ⓑ Ⓒ Ⓓ Ⓔ | 40 Ⓐ Ⓑ Ⓒ Ⓓ Ⓔ | 65 Ⓐ Ⓑ Ⓒ Ⓓ Ⓔ | 90 Ⓐ Ⓑ Ⓒ Ⓓ Ⓔ |
| 16 Ⓐ Ⓑ Ⓒ Ⓓ Ⓔ | 41 Ⓐ Ⓑ Ⓒ Ⓓ Ⓔ | 66 Ⓐ Ⓑ Ⓒ Ⓓ Ⓔ | 91 Ⓐ Ⓑ Ⓒ Ⓓ Ⓔ |
| 17 Ⓐ Ⓑ Ⓒ Ⓓ Ⓔ | 42 Ⓐ Ⓑ Ⓒ Ⓓ Ⓔ | 67 Ⓐ Ⓑ Ⓒ Ⓓ Ⓔ | 92 Ⓐ Ⓑ Ⓒ Ⓓ Ⓔ |
| 18 Ⓐ Ⓑ Ⓒ Ⓓ Ⓔ | 43 Ⓐ Ⓑ Ⓒ Ⓓ Ⓔ | 68 Ⓐ Ⓑ Ⓒ Ⓓ Ⓔ | 93 Ⓐ Ⓑ Ⓒ Ⓓ Ⓔ |
| 19 Ⓐ Ⓑ Ⓒ Ⓓ Ⓔ | 44 Ⓐ Ⓑ Ⓒ Ⓓ Ⓔ | 69 Ⓐ Ⓑ Ⓒ Ⓓ Ⓔ | 94 Ⓐ Ⓑ Ⓒ Ⓓ Ⓔ |
| 20 Ⓐ Ⓑ Ⓒ Ⓓ Ⓔ | 45 Ⓐ Ⓑ Ⓒ Ⓓ Ⓔ | 70 Ⓐ Ⓑ Ⓒ Ⓓ Ⓔ | 95 Ⓐ Ⓑ Ⓒ Ⓓ Ⓔ |
| 21 Ⓐ Ⓑ Ⓒ Ⓓ Ⓔ | 46 Ⓐ Ⓑ Ⓒ Ⓓ Ⓔ | 71 Ⓐ Ⓑ Ⓒ Ⓓ Ⓔ | 96 Ⓐ Ⓑ Ⓒ Ⓓ Ⓔ |
| 22 Ⓐ Ⓑ Ⓒ Ⓓ Ⓔ | 47 Ⓐ Ⓑ Ⓒ Ⓓ Ⓔ | 72 Ⓐ Ⓑ Ⓒ Ⓓ Ⓔ | 97 Ⓐ Ⓑ Ⓒ Ⓓ Ⓔ |
| 23 Ⓐ Ⓑ Ⓒ Ⓓ Ⓔ | 48 Ⓐ Ⓑ Ⓒ Ⓓ Ⓔ | 73 Ⓐ Ⓑ Ⓒ Ⓓ Ⓔ | 98 Ⓐ Ⓑ Ⓒ Ⓓ Ⓔ |
| 24 Ⓐ Ⓑ Ⓒ Ⓓ Ⓔ | 49 Ⓐ Ⓑ Ⓒ Ⓓ Ⓔ | 74 Ⓐ Ⓑ Ⓒ Ⓓ Ⓔ | 99 Ⓐ Ⓑ Ⓒ Ⓓ Ⓔ |
| 25 Ⓐ Ⓑ Ⓒ Ⓓ Ⓔ | 50 Ⓐ Ⓑ Ⓒ Ⓓ Ⓔ | 75 Ⓐ Ⓑ Ⓒ Ⓓ Ⓔ | 100 Ⓐ Ⓑ Ⓒ Ⓓ Ⓔ |

Sample Image Scanner OMR Form with Corner Marks
Figure 3
(Prior Art)

GENERAL ANSWER SHEET

NAME _____

CLASS _____

SUBJECT _____

INDEX NUMBER

| | 0 1 2 3 4 5 6 7 8 9 |
| | 0 1 2 3 4 5 6 7 8 9 |
| | 0 1 2 3 4 5 6 7 8 9 |
| | 0 1 2 3 4 5 6 7 8 9 |
| | 0 1 2 3 4 5 6 7 8 9 |
| | 0 1 2 3 4 5 6 7 8 9 |

START

| # | | # | | # | | # | |
|---|---|---|---|---|---|---|---|
| 01 | Ⓐ Ⓑ Ⓒ Ⓓ Ⓔ | 26 | Ⓐ Ⓑ Ⓒ Ⓓ Ⓔ | 51 | Ⓐ Ⓑ Ⓒ Ⓓ Ⓔ | 76 | Ⓐ Ⓑ Ⓒ Ⓓ Ⓔ |
| 02 | Ⓐ Ⓑ Ⓒ Ⓓ Ⓔ | 27 | Ⓐ Ⓑ Ⓒ Ⓓ Ⓔ | 52 | Ⓐ Ⓑ Ⓒ Ⓓ Ⓔ | 77 | Ⓐ Ⓑ Ⓒ Ⓓ Ⓔ |
| 03 | Ⓐ Ⓑ Ⓒ Ⓓ Ⓔ | 28 | Ⓐ Ⓑ Ⓒ Ⓓ Ⓔ | 53 | Ⓐ Ⓑ Ⓒ Ⓓ Ⓔ | 78 | Ⓐ Ⓑ Ⓒ Ⓓ Ⓔ |
| 04 | Ⓐ Ⓑ Ⓒ Ⓓ Ⓔ | 29 | Ⓐ Ⓑ Ⓒ Ⓓ Ⓔ | 54 | Ⓐ Ⓑ Ⓒ Ⓓ Ⓔ | 79 | Ⓐ Ⓑ Ⓒ Ⓓ Ⓔ |
| 05 | Ⓐ Ⓑ Ⓒ Ⓓ Ⓔ | 30 | Ⓐ Ⓑ Ⓒ Ⓓ Ⓔ | 55 | Ⓐ Ⓑ Ⓒ Ⓓ Ⓔ | 80 | Ⓐ Ⓑ Ⓒ Ⓓ Ⓔ |
| 06 | Ⓐ Ⓑ Ⓒ Ⓓ Ⓔ | 31 | Ⓐ Ⓑ Ⓒ Ⓓ Ⓔ | 56 | Ⓐ Ⓑ Ⓒ Ⓓ Ⓔ | 81 | Ⓐ Ⓑ Ⓒ Ⓓ Ⓔ |
| 07 | Ⓐ Ⓑ Ⓒ Ⓓ Ⓔ | 32 | Ⓐ Ⓑ Ⓒ Ⓓ Ⓔ | 57 | Ⓐ Ⓑ Ⓒ Ⓓ Ⓔ | 82 | Ⓐ Ⓑ Ⓒ Ⓓ Ⓔ |
| 08 | Ⓐ Ⓑ Ⓒ Ⓓ Ⓔ | 33 | Ⓐ Ⓑ Ⓒ Ⓓ Ⓔ | 58 | Ⓐ Ⓑ Ⓒ Ⓓ Ⓔ | 83 | Ⓐ Ⓑ Ⓒ Ⓓ Ⓔ |
| 09 | Ⓐ Ⓑ Ⓒ Ⓓ Ⓔ | 34 | Ⓐ Ⓑ Ⓒ Ⓓ Ⓔ | 59 | Ⓐ Ⓑ Ⓒ Ⓓ Ⓔ | 84 | Ⓐ Ⓑ Ⓒ Ⓓ Ⓔ |
| 10 | Ⓐ Ⓑ Ⓒ Ⓓ Ⓔ | 35 | Ⓐ Ⓑ Ⓒ Ⓓ Ⓔ | 60 | Ⓐ Ⓑ Ⓒ Ⓓ Ⓔ | 85 | Ⓐ Ⓑ Ⓒ Ⓓ Ⓔ |
| 11 | Ⓐ Ⓑ Ⓒ Ⓓ Ⓔ | 36 | Ⓐ Ⓑ Ⓒ Ⓓ Ⓔ | 61 | Ⓐ Ⓑ Ⓒ Ⓓ Ⓔ | 86 | Ⓐ Ⓑ Ⓒ Ⓓ Ⓔ |
| 12 | Ⓐ Ⓑ Ⓒ Ⓓ Ⓔ | 37 | Ⓐ Ⓑ Ⓒ Ⓓ Ⓔ | 62 | Ⓐ Ⓑ Ⓒ Ⓓ Ⓔ | 87 | Ⓐ Ⓑ Ⓒ Ⓓ Ⓔ |
| 13 | Ⓐ Ⓑ Ⓒ Ⓓ Ⓔ | 38 | Ⓐ Ⓑ Ⓒ Ⓓ Ⓔ | 63 | Ⓐ Ⓑ Ⓒ Ⓓ Ⓔ | 88 | Ⓐ Ⓑ Ⓒ Ⓓ Ⓔ |
| 14 | Ⓐ Ⓑ Ⓒ Ⓓ Ⓔ | 39 | Ⓐ Ⓑ Ⓒ Ⓓ Ⓔ | 64 | Ⓐ Ⓑ Ⓒ Ⓓ Ⓔ | 89 | Ⓐ Ⓑ Ⓒ Ⓓ Ⓔ |
| 15 | Ⓐ Ⓑ Ⓒ Ⓓ Ⓔ | 40 | Ⓐ Ⓑ Ⓒ Ⓓ Ⓔ | 65 | Ⓐ Ⓑ Ⓒ Ⓓ Ⓔ | 90 | Ⓐ Ⓑ Ⓒ Ⓓ Ⓔ |
| 16 | Ⓐ Ⓑ Ⓒ Ⓓ Ⓔ | 41 | Ⓐ Ⓑ Ⓒ Ⓓ Ⓔ | 66 | Ⓐ Ⓑ Ⓒ Ⓓ Ⓔ | 91 | Ⓐ Ⓑ Ⓒ Ⓓ Ⓔ |
| 17 | Ⓐ Ⓑ Ⓒ Ⓓ Ⓔ | 42 | Ⓐ Ⓑ Ⓒ Ⓓ Ⓔ | 67 | Ⓐ Ⓑ Ⓒ Ⓓ Ⓔ | 92 | Ⓐ Ⓑ Ⓒ Ⓓ Ⓔ |
| 18 | Ⓐ Ⓑ Ⓒ Ⓓ Ⓔ | 43 | Ⓐ Ⓑ Ⓒ Ⓓ Ⓔ | 68 | Ⓐ Ⓑ Ⓒ Ⓓ Ⓔ | 93 | Ⓐ Ⓑ Ⓒ Ⓓ Ⓔ |
| 19 | Ⓐ Ⓑ Ⓒ Ⓓ Ⓔ | 44 | Ⓐ Ⓑ Ⓒ Ⓓ Ⓔ | 69 | Ⓐ Ⓑ Ⓒ Ⓓ Ⓔ | 94 | Ⓐ Ⓑ Ⓒ Ⓓ Ⓔ |
| 20 | Ⓐ Ⓑ Ⓒ Ⓓ Ⓔ | 45 | Ⓐ Ⓑ Ⓒ Ⓓ Ⓔ | 70 | Ⓐ Ⓑ Ⓒ Ⓓ Ⓔ | 95 | Ⓐ Ⓑ Ⓒ Ⓓ Ⓔ |
| 21 | Ⓐ Ⓑ Ⓒ Ⓓ Ⓔ | 46 | Ⓐ Ⓑ Ⓒ Ⓓ Ⓔ | 71 | Ⓐ Ⓑ Ⓒ Ⓓ Ⓔ | 96 | Ⓐ Ⓑ Ⓒ Ⓓ Ⓔ |
| 22 | Ⓐ Ⓑ Ⓒ Ⓓ Ⓔ | 47 | Ⓐ Ⓑ Ⓒ Ⓓ Ⓔ | 72 | Ⓐ Ⓑ Ⓒ Ⓓ Ⓔ | 97 | Ⓐ Ⓑ Ⓒ Ⓓ Ⓔ |
| 23 | Ⓐ Ⓑ Ⓒ Ⓓ Ⓔ | 48 | Ⓐ Ⓑ Ⓒ Ⓓ Ⓔ | 73 | Ⓐ Ⓑ Ⓒ Ⓓ Ⓔ | 98 | Ⓐ Ⓑ Ⓒ Ⓓ Ⓔ |
| 24 | Ⓐ Ⓑ Ⓒ Ⓓ Ⓔ | 49 | Ⓐ Ⓑ Ⓒ Ⓓ Ⓔ | 74 | Ⓐ Ⓑ Ⓒ Ⓓ Ⓔ | 99 | Ⓐ Ⓑ Ⓒ Ⓓ Ⓔ |
| 25 | Ⓐ Ⓑ Ⓒ Ⓓ Ⓔ | 50 | Ⓐ Ⓑ Ⓒ Ⓓ Ⓔ | 75 | Ⓐ Ⓑ Ⓒ Ⓓ Ⓔ | 100 | Ⓐ Ⓑ Ⓒ Ⓓ Ⓔ |

Sample Image Scanner OMR Form
Figure 4
(Prior Art)

Plain Paper Optical Mark Reading

**Plain-Paper OMR Mark-Sense "Response Bubbles"

**Grids

**Mark-Sense Form with Zones

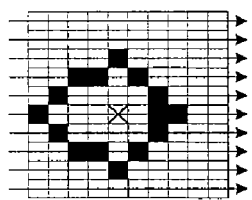 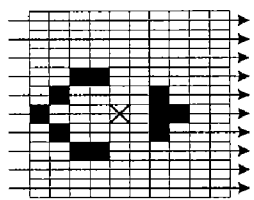 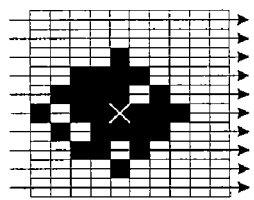
| The scan of a valid bubble | An invalid bubble | A marked bubble |
|:-:|:-:|:-:|
| (a) | (b) | (c) |
(Note: Resolution shown is coarse. A typical bubble will occupy an area of 30 x 30 pixels or more.)
Response Bubble Recognition
Figure 9
(Prior Art)

**Inferential Self-Registration Mark-Sense Response Bubbles

**Incomplete Grid

What animals are on your property?
- ◯ We have pets  ◯ dogs  ◯ cats  ◯ others
- ◯ Farm animals  ◯ horses  ◯ cows  ◯ others
Do you grow crops?
- ◯ wheat, rye, hay  ◯ corn  ◯ soy  ◯ others
A Logical Zone
(a)
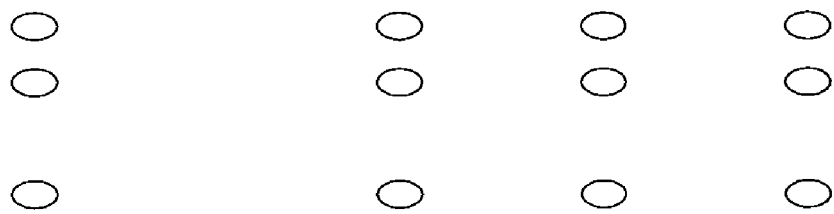
The Scanned Zone
(b)
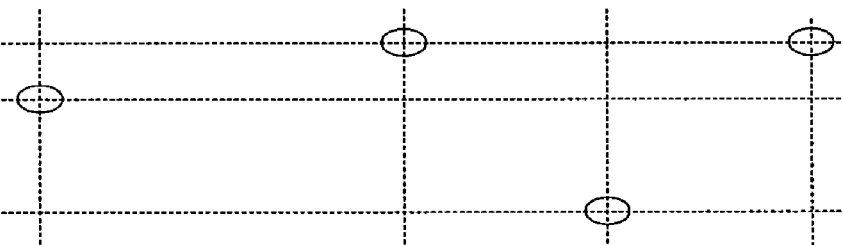
A Scanned Zone with Missing Bubbles
(c)
Possible Example of Zone Validation
Figure 12

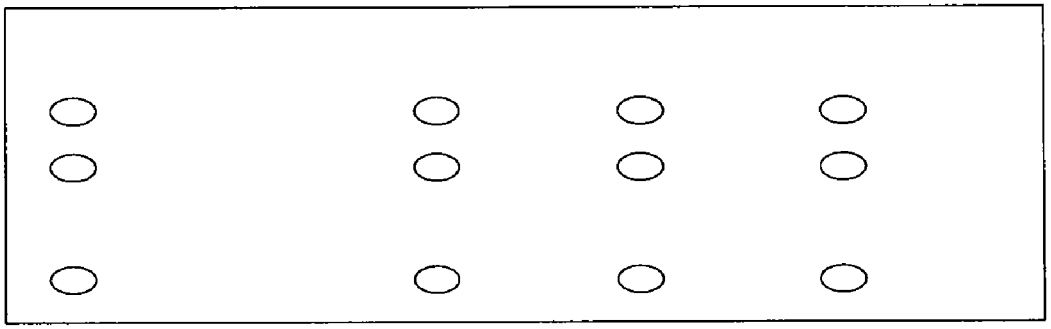
Well-Formed Zone With All Well-Formed Bubbles
(a)
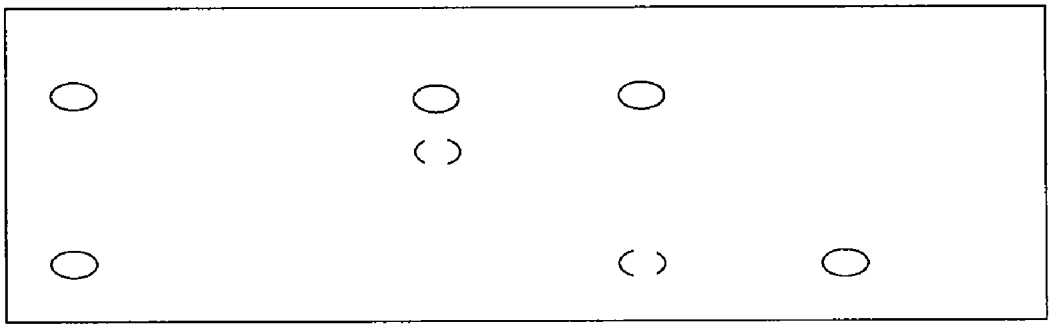
Well-Formed Zone With Both Well-Formed and Not Well-Formed Bubbles
(b)
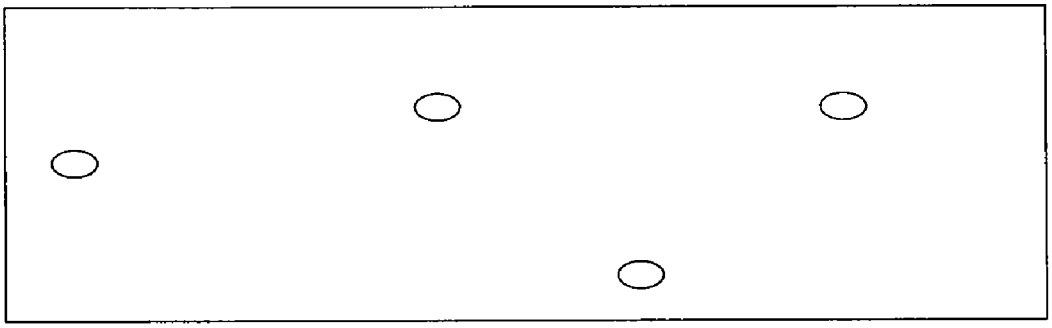
Well-Formed Zone With One Well-Formed Bubble In Each Row and Column
(c)
Example of Well-Formed Zones
Figure 13

**Form Registration

**Form Skew

**Mismarked Response Bubble

User-Defined Registration Marks

Registration on a Graphic

**Registration on Row and Column Headers

Registration on a Form Border

Sample Confusing Response Report Graph for Query 1

Sample Confusing Query Report Graph for All Queries

FORM TEMPLATE FORMAT

FORM STRUCTURE

| Parameter | VB Type | Description |
|---|---|---|
| NumPages | Integer | The number of pages that make up this template file. |
| NumZones | Integer | The number of zones in the entire form. |
| NumItems | Integer | The number of data items (set MAXCOLS equal to this) in the form. |
| Orientation | Integer | The orientation of the form:<br>0 = PORTRAIT<br>1 = LANDSCAPE |
| PageHeight | Single | The height of the page in inches. |
| PageWidth | Single | The width of the page in inches. |
| Version | String | The version number of this template |
| Description | String | A template description typed in by the user. |

Figure 28B

PAGE STRUCTURE

| Parameter | VB Type | Description |
|---|---|---|
| NumZones | Integer | The number of zones on this page. |
| NumItems | Integer | The number of data items on this page. |
| LargeZone | Integer | Tells which of the X zones on the page contains the largest number of bubbles. This may be used to help with ISR page registration. |

Figure 28C

JOIN STRUCTURE

| Parameter | VB Type | Description |
|---|---|---|
| JoinedZones | Integer | The number of OMR zones to be joined. |

Figure 28D

ZONE STRUCTURE

| Parameter | VB Type | Description |
|---|---|---|
| NumItems | Integer | The number of queries that this zone will take in the output grid. |
| RecogType | Integer | The type of the zone. |
| LowerX | Integer | The lower X coordinate for the zone. |
| LowerY | Integer | The lower Y coordinate for the zone. |
| UpperX | Integer | The upper X coordinate for the zone. |
| UpperY | Integer | The upper Y coordinate for the zone. |
| Name | String | This is the name for the zone. |
| QueryNames | String array | The name for the query(s) in the zone. |
| QueryText | String array | The text for the query(s). |
| NumRows | Integer | For an OMR zone, the number of rows of response bubbles in the zone. |
| NumCols | Integer | For an OMR zone, the number of columns of response bubbles in the zone. |
| Orient | Integer | For OMR zones:<br>1 = ROW (each row is one item)<br>2 = COLUMN (each column is one item) |
| MultsAllowed | Integer | For an OMR zone, tells if multiple responses are allowed. Values:<br>0 – Multiples not allowed<br>1 – Multiples allowed (no limitation)<br>Any positive value greater than 1 – Maximum multiples allowed |
| Mults | String | A string containing the output value(s) to return when multiple responses are found for a query and are not allowed. |
| Blanks | String | A string containing the blank response code output value(s) to return when all blank response bubble(s) is found for a query. |
| Erased | String | A string containing the erased response code output value(s) to return when an erased response bubble(s) is found for a response bubble. |
| FilledThreshold | Binary structure | Data indicating the definition for the image data analysis software to determine that a response bubble is filled-in. |
| OutputValues | String array | Saved in the template as a TAB delimited string containing the output values and/or other attributes for the response bubbles in a zone. |
| ISRDefintion | Binary structure | A binary structure containing information necessary for inferential self-registration and recognition. Elements include:<br><br>Zone location threshold level.<br>Zone shape definition.<br>Zone size definition.<br>Zone spacing definition.<br>Response bubble(s) location and spacing definitions.<br>Well formed response bubble definition.<br>Erased response bubble definition.<br>Multiple response definition. |

Figure 28E

INFERENTIAL SELF-REGISTRATION OF IMPERFECT OMR FORMS

CROSS-REFERENCE TO RELATED APPLICATIONS

This application claims the benefit of U.S. Provisional Application No. 60/985,736 filed Nov. 6, 2007.

BACKGROUND OF THE INVENTION

1. General Background

Traditional Optical Mark Reader (OMR) systems require mark-sense forms that are specially designed with forms-creation software and that provide accurate printed registration marks to locate the response bubbles containing the data. These forms must be printed using high-end printers on high-quality paper that will not deform. Special ink colors that are transparent to the scanning process may have to be used. As a result, forms can cost the user from $0.25 to $1.00 per page.

The marking of forms must be done with a specified marking device, such as a #2 pencil. Marking areas, called response bubbles, must be filled in accurately. Finally, the forms must be read by highly accurate, specialized OMR scanners.

Current plain-paper OMR technology is not bound by these restrictions. It uses pattern recognition technology to automatically find response bubbles without the use of registration marks and to determine whether or not the response bubbles are marked.

There are two types of commercially available plain-paper technologies in use today. One prints registration marks on the forms. The other technology does not require the use of any preprinted registration marks but instead depends upon the location of the response bubbles for registration. Using pattern-recognition technology, both types automatically register the form, find response bubbles, and determine whether or not the response bubbles are marked. This technology allows mark-sense forms to be designed using standard, commercially available word-processing or graphics packages and to be printed by any quality printer on most papers. Any pencil or pen may be used to mark the forms, and the forms can be read using any reasonable quality off-the-shelf image scanner.

However, current plain-paper technology requires that all response bubbles on the form, whether filled in or not, be located. Response bubbles may not be recognized if they are damaged, missing, erased, or mismarked. If a current plain-paper OMR system cannot find a response bubble, the field containing that response bubble is treated as an exception. This creates an error that requires manual intervention to correct. What is needed is a plain-paper OMR system that can recognize and process forms even if response bubbles on the form are damaged, missing, erased, or mismarked. The present invention addresses this need via inferential self-registration.

Using enhanced pattern recognition techniques, inferential self-registration can infer the locations of not well-formed response bubbles due to erasure, white out (whiteout), or other causes. It treats these not well-formed response bubbles as unmarked response bubbles and does not invalidate the zone. As a result, forms analysis is much more complete and accurate. Inferential self-registration retains all of the advantages of current plain-paper OMR systems, such as the use of standard paper, off-the-shelf printers, standard commercially available image scanners, and common marking instruments. In addition, it solves the problem of not well-formed response bubbles. Test or survey takers can erase or white out response bubbles. Using inferential self-registration, response bubbles that are damaged by paper handling or printer faults (response bubble faults) become transparent to the recognition process, and the form can be completely and correctly analyzed without costly manual intervention.

2. Additional Background on OMR Technology:

Optical mark reading (OMR) is used extensively in education, market research, government, and other areas for testing, surveying, and many additional uses. OMR forms, specially prepared for each use, contain specific areas (such as circles), sometimes referred to as response bubbles, that can be filled in by respondents in response to questions. FIG. 1 shows a typical prior art OMR form. Optical mark recognition (OMR) equipment is used to read the respondents' answers that are marked on these forms in order to grade tests, to summarize surveys, or to fulfill whatever purpose for which the form was designed.

As discussed above, traditional OMR technology requires these forms to be highly accurate and to be preprinted with registration marks in order to be properly read. The forms must typically be printed in "drop-out" inks so that response bubble outlines and form text are not visible to the scanning equipment. As a consequence, these forms typically cost the user from $0.25 to $1.00 per page. Furthermore, the forms must often be filled out with a specified writing implement, such as a #2 pencil; and they must be read and be processed by specialized OMR scanners.

Currently available plain-paper OMR systems provide an OMR capability that is not bound by these restrictions. Using pattern recognition techniques, this technology allows ordinary word-processing and printing products to be used to prepare these forms; and common pencils or pens may be used to mark the response bubbles. The forms can then be read by any image scanner. As a consequence, users can achieve significant savings when using plain-paper mark sensing for testing, for the taking of surveys, and for any other use to which they may put OMR technology.

However, as discussed above, current plain-paper OMR technology suffers from a major problem, namely, that it is not able to handle response bubbles that are not recognizable due to erasures, whiteouts, printing faults, mismarkings, or many other reasons. If a response bubble cannot be found, the field containing that response bubble is reported as an exception and must be corrected manually—a costly and time-consuming process.

In summary, there are two known forms of OMR systems:
1. Traditional OMR: Traditional OMR technology uses specialized, expensive OMR scanners to scan and recognize mark-sense forms specially designed for use with OMR scanners. The forms require exact offset printing, the use of timing marks and registration marks, drop-out inks, must be completed using #2 pencils or certain color inks, and usually cost between $0.25 and $1.00 each.
2. Plain-Paper OMR: Plain-paper OMR technology uses pattern-recognition software to process and recognize images of mark-sense forms scanned by any common image scanner. Plain-paper forms can be designed anywhere and printed inexpensively on common printers and copy paper. Some plain-paper OMR software require the use of form registration marks, and some do not. When form registration marks are not used, the response bubbles themselves are used to register the page.

Before describing inferential self-registration technology, current mark-sense technology is reviewed.

Mark-sensing is a technique for automatically processing forms filled in by respondents. Mark-sense forms are quite flexible in their design. As a general rule, they contain specific areas, or response bubbles, in which a user can make a mark in order to answer a multiple choice question (FIG. 2, box (a)), to enter a numeric or alphabetic value (FIG. 2, box (b)), or to respond to any query which can be answered by one or more marks in predetermined areas.

In addition, a mark-sense form may contain bar codes and areas for written responses. These sources of information are not considered in this description of optical mark reading, which deals only with the reading of the marks within response bubbles.

In some cases, questions are integrated with the mark-sense areas on the same form (FIG. 2, box (a)). In other cases, numbered questions may be contained on a separate form, and the mark-sense form contains only the areas in which to mark the answers to the question (FIG. 2, box (c)).

Traditional OMR technology is quite restrictive. Because of the precision with which forms must be printed, they generally must be purchased from a forms manufacturer at a cost of $0.25 to $1.00 each. Forms must be marked with pre-scribed marking implements, such as a #2 pencil, and forms that have been marked by respondents must be read via specialized OMR scanners, such as the Scantrono ScanMark series, available from Scantron Corporation, Irvine, Calif., which attempt to recognize the marks made by each respondent. The marked response bubbles for each form are recorded, and this information is acted upon by an appropriate processing program to grade tests, to summarize surveys, or to provide whatever other processing function is required by the application.

To facilitate accurate scanning of mark-sense forms, traditional systems require the use of precise registration marks on forms in order to identify the rows and/or columns, as shown in FIG. 1. The registration marks are used to determine the positions of the mark-sense response bubbles. By using these registration marks, the OMR scanner can accurately determine the locations of mark-sense response bubbles and can determine whether or not those response bubbles have been marked.

Limitations of traditional OMR technology include the following:
1. Forms must be created by using special OMR forms creation software (typically performed as a service at a high cost).
2. The form registration marks must be located in a predefined location (along the left border of the page), or the form cannot be recognized. The OMR scanner hardware expects standardized registration marks.
3. The forms must be printed to exacting tolerances. Small variations in printing can render the form useless since the OMR scanner won't be able to locate the timing marks on the page or the individual mark locations.
4. Forms must be filled out with #2 pencils or specific pen colors (if an ink read head is used).
5. Forms must be scanned with the timing marks on the left. If the forms are rotated, they cannot be recognized.
6. Forms cannot be skewed or offset when scanned. Traditional OMR scanners cannot recognize forms that are skewed or offset during the scanning process.
7. Traditional OMR scanners usually cannot recognize forms that have writing or extraneous marks in the timing mark area.
8. Form compression or expansion due to humidity or other environmental factors can render traditional OMR forms unreadable due to the OMR scanner's need for precise positioning.
9. Error correction is difficult since there is no image of the form with which to compare the recognized result.
10. Both the OMR scanner and the forms that they require are very expensive.

Plain-Paper OMR Technology: Advances in OMR technology have led to the capability of using ordinary printers, plain paper, and standard inks, thus reducing significantly the cost of OMR forms. Many of the OMR products today that use plain-paper forms require page registration marks that can be used to logically align the page, as shown in FIG. 3. In addition to determining the locations of response bubbles, these registration marks are useful to eliminate skew and to compensate for document compression or expansion.

Furthermore, expensive, specialized OMR scanners are not needed. These plain-paper forms can be read by standard off-the-shelf image scanners that provide graphical data that can be processed to identify the marked response bubbles.

However, as is the case with row and column registration marks, page registration marks as shown in FIG. 3 take up critical space on an OMR form (consider the density of response bubbles in FIG. 1). Furthermore, users often do not like the aesthetics of forms with registration marks. They appear antiseptic and not user-friendly. Later advances led to scanning techniques that do not require the printing of any registration marks on the OMR form (FIG. 4). Rather, pattern recognition techniques are used to identify response bubbles and to determine whether a response bubble is marked or not. In effect, the expected locations of the response bubbles are used as implicit registration marks. An example of such a product is Remark Office OMR®, Version 6, available from Gravic, Inc., Malvern, Pa.

These advances in OMR technology have led to many advantages over traditional OMR products. Mark-sense forms may be created with any software package, such as Microsoft® Word, may be printed on plain paper by any quality printer, and may be read by any image scanner (FIG. 5). Form creation is more flexible, and the cost of forms is dramatically reduced. The printers and scanners required are much less expensive. Furthermore, the range of marking instruments that may be used is greatly extended.

It is imperative that the image scanner can accurately locate the mark-sense response bubbles so that it can correctly determine whether or not each response bubble is marked. This is complicated by many factors:
1. One set of forms may be printed by many printers and may therefore differ slightly from one another.
2. The forms may be read by different scanners. The dimensions determined by one scanner may be different from those determined by another scanner.
3. The form may be skewed by the printing process or by the scanning process so that rows are not exactly horizontal or that columns are not exactly vertical.
4. The skew may not be linear. It may be curved slightly, caused, for instance, by the scanning of the document from a single point that sweeps the document.
5. The form may be slightly compressed or expanded by the printing and/or scanning processes or by paper deformation due, for instance, to humidity.
6. There may be partial or invalid response bubbles.

The pattern-recognition techniques used in current plain-paper OMR generally solve these problems except for the last one. A major problem with current plain-paper OMR products is that there may be partial or invalid response bubbles. Response bubbles may be not well-formed due to erasures, whiteouts, printer faults, and so on. Current plain-paper OMR technology requires that all response bubbles, whether filled in or not, can be located and recognized. This is needed to ensure proper registration and accurate reading of the OMR form. If any one response bubble on the form cannot be located, an error is generated and must be corrected manually.

What is needed is a method to automatically detect and compensate for the above problem of not well-formed response bubbles. The present invention, hereinafter called "inferential self-registration," or ISR, provides this capability. As a result, marked forms with missing or damaged response bubbles can be read and analyzed without manual intervention, thus saving significant analysis cost and time.

Inferential self-registration uses pattern-recognition techniques more advanced than those used for current plain-paper OMR to deduce the locations of mark-sense response bubbles more easily and quickly without the need for registration marks or special drop-out inks. In addition, it is not necessary to be able to locate or identify every response bubble on the OMR form. Only the identification of enough response bubbles to guarantee accurate registration is required.

3. Additional Background on Plain-Paper OMR

Before describing inferential self-registration technology, it is important to understand in more detail contemporary plain-paper OMR technology. This more detailed description of plain-paper OMR technology follows.

A. Forms

Using plain-paper OMR technology, forms can be designed with any word processor or equivalent facility and can be printed on any printer of reasonable quality. Any font may be used, and the form may be printed with normal black ink. The requirements for a mark-sense form usable by plain-paper OMR include the following:

A1. Response Bubbles

The response bubbles are the areas in which marks can be made. Any enclosed shape that can indicate the area in which to place a mark can be used for a response bubble (FIG. 6). Response bubbles may be constructed graphically, or they may be one or more standard textual characters entered via a word-processing program or other package used to create the form. For instance, an Arial capital O would form a perfectly adequate response bubble. Response bubbles can contain a letter or a number within the confines of the response bubble to aid the respondent in choosing the proper response bubble to mark. Such a character should be small enough and light enough so that it is not mistaken as a mark. Such response bubbles can be constructed graphically, or they may be provided via a specialized font.

A2. Grids

Response bubbles on a mark-sense form are arranged as one or more fully configured grids. There can be any number of rows and any number of columns in a grid. The rows and columns do not have to be evenly spaced. However, there must be the same number of response bubbles in each row and the same number of response bubbles in each column, and the response bubbles must be arranged in a rectangular grid (FIG. 7, part (a)). If it is desired to have a partially formed "grid" which is not a fully formed rectangular grid, it can be defined as multiple grids (FIG. 7, part (b)).

A3. Zones

A zone is an area on the mark-sense form that contains a grid of mark-sense response bubbles. Any number of zones may be on the form (FIG. 8). Different zones may be configured differently with grids of different sizes and spacings. In plain-paper OMR systems, there cannot be any text within a zone unless it is printed with a drop-out color (a color that is invisible to the image scanner), as that would confuse the OMR software when it tries to find marks. However, there may be text or images in other areas of the form so long as they do not overlap a zone. Good form design for plain-paper systems requires that there be an adequate margin between a zone and any neighboring text or images so that skew or other form distortion does not cause the OMR software to read text or images as being in the zone. For instance, if it is determined that skew can cause the form to be misregistered by up to ⅜ of an inch, there should be a margin of at least ⅜ of an inch between each zone and any neighboring printing.

B. Mark-Sense Response Bubble Identification

Given a scanned image of a mark-sense form, mark-sense response bubbles are identified using pattern recognition technology. The image scanner has reduced the mark-sense form to an array of closely spaced pixels (typically, 200 per inch). Each pixel has a binary value. Its value is "zero" if it is white or "one" if it is dark (due to printing or marking). Response bubbles are typically 10 to 14 points in size. "Point" is a typesetting measure. There are 72 points to the inch. Therefore, at a scanning resolution of 200 pixels per inch, each response bubble will be represented by an array of approximately 30×30 to 40×40 pixels.

Given the zone area that should contain the response bubble grid, that area is searched to determine if there is a shape within it that could be a response bubble. For instance, the area can be searched with a rectangular scan, looking for pixels in each row of the pixel array. A valid response bubble will contain a set of marked pixels in the shape expected (FIG. 9, image (a)). The marked pixels will all be connected. If a set of pixels does not conform to the expected response bubble shape, it will be ignored (FIG. 9, image (b)). If a valid response bubble is detected by this or other pattern-recognition means, its approximate center is determined. The center (noted by the X in images (a)-(c) of FIG. 9) is used as the position measurement for the response bubble. If a response bubble is marked (such as by filling it in with a pencil), the inner pixels of the response bubble will be noted as marked (binary values of "one"). If more than a certain percentage of the pixels within a response bubble are marked, the response bubble is determined to be marked (FIG. 9, image (c)). This percentage is a parameter that can be set by the user.

C. Template Editor

Before processing marked forms, the system must be "taught" the layout of the form. This is done by presenting a template editor with a scanned image of an unmarked mark-sense form (the template) to be read. The template editor is a software package that allows the user to describe the format of the mark-sense form.

C1. Zone Identification

One way to define the mark-sense form with the template editor is to present the scanned image of the template to the user via a display. The user selects a zone on the page by dragging a rectangle around it (a technique used by contemporary graphic packages to select a group of objects). The user then enters the number of rows and the number of columns of mark-sense response bubbles in the zone.

C2. Zone Validation and Measurement

Following zone identification, the template editor must verify that the grid within the zone is correctly dimensioned according to the user-entered parameters. It must determine the exact position of the grid on the template, and it must determine the inter-row and inter-column spacings of the grid within the zone. Using the response bubble identification logic described above, the template editor searches the zone for response bubbles by scanning vertically and horizontally within the zone. It verifies that the number of response bubbles that it has found matches that entered by the user and then records the grid position and the distances between the centers of the response bubbles in a row and the centers of the response bubbles in a column.

The user further describes the zone by giving it a name, by optionally giving each column and each row a description, by noting whether the answers to a question in the zone are vertically or horizontally oriented, by specifying whether each column and each row allow multiple choices, and by providing other information common to OMR processing.

At this point, the OMR system has the information that it needs to read marks in this zone. The user then selects the other zones on the template and proceeds as described above to completely define the format of the entire mark-sense form to the system.

D. Scanning

When a set of mark-sense forms are ready for processing, they are scanned into the system by any appropriate image scanner or digital camera. The scanner need only be one with a sufficiently high resolution and may present its results in any standard graphic form, such as pdf, tif, jpeg, or gif. Ideally, the same scanner, or the same make and model scanner, as that used for scanning the template should be used. However, this is not a necessary requirement.

E. Response Bubble Marking

With plain-paper OMR technology, there is no need to require that a certain marking device, such as a #2 pencil, be used to fill the response bubbles. Any pencil or pen may be used so long as the mark is dark enough to be imaged by the image scanner.

F. Auto-Alignment

If a different scanner is used to scan mark-sense forms than that used to create the form template, image distortion could affect the recognition of marks on these forms. In this case, the plain-paper OMR technology can be used to create a new, more accurate, template.

To do this, the template form is scanned via the image scanner to be used, and the resulting image is entered into the system. The template that was previously created can now be used as a starting point to locate the response bubbles in each zone. If the positions of these response bubbles differs from that shown in the original template, a new template is created using the updated positions. In this way, a new template matching the characteristics of the current scanner being used can be automatically created without all of the detailed graphic manipulation and data entry required to create the original template.

BRIEF SUMMARY OF THE INVENTION

Inferential Self-Registration (ISR) provides a new form of OMR technology. Inferential self-registration is a new extension of existing plain-paper OMR technology. Plain-paper OMR requires the entire zone of response bubbles to be detected in order to register a page. ISR, on the other hand, can infer the locations of missing or damaged marks, thereby registering the page with only a small subset of the marks being present. Furthermore, ISR can register a page using other form elements, such as graphics, text, or lines.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown.

In the drawings:

FIGS. 1-4 show prior art OMR forms.

FIGS. 6-9 show prior art response bubbles.

FIGS. 11-20 show response bubbles and zones that illustrate features in preferred embodiments of the present invention.

FIGS. 28A-28E, taken together, show a form template format.

DETAILED DESCRIPTION OF THE INVENTION

Figure 1:
Figure 5:
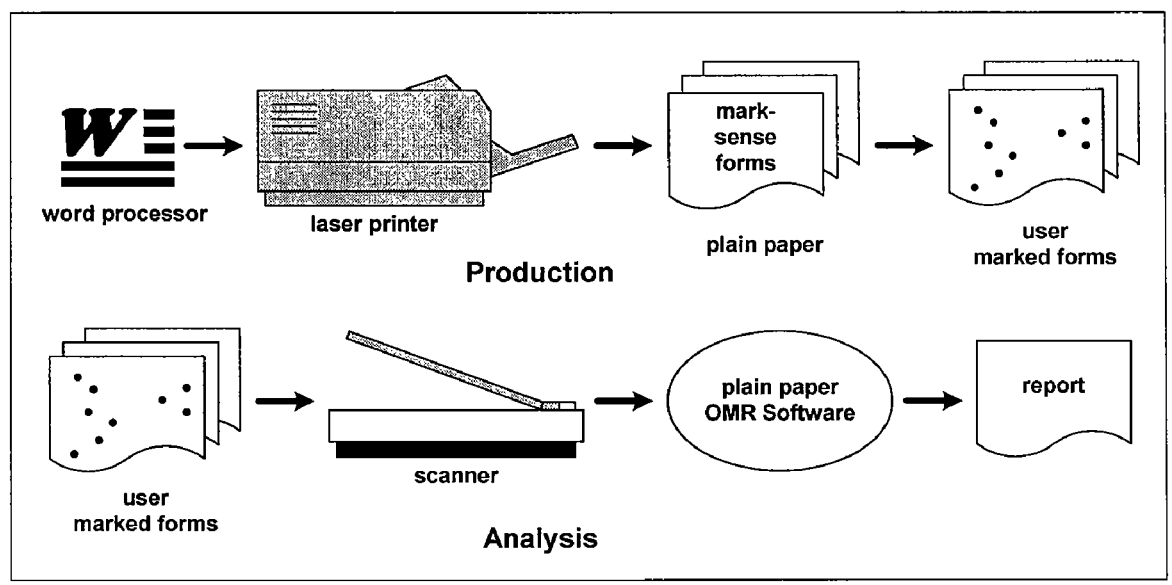
FIG. 5 shows a prior art plain paper OMR reading process.
Figure 6:
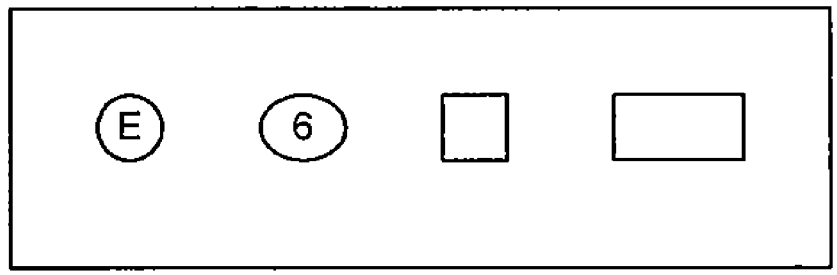
Figure 7:
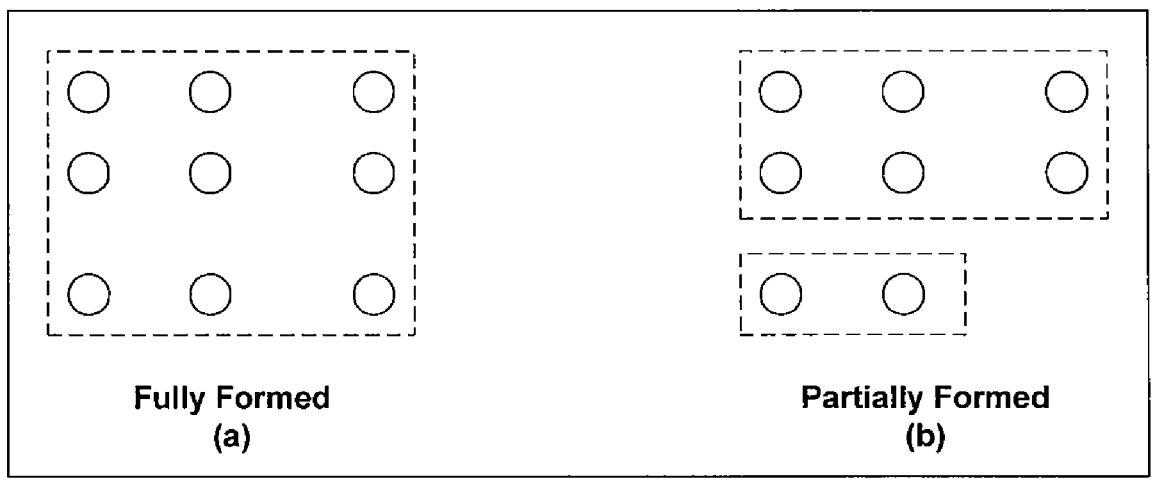
Figure 8:
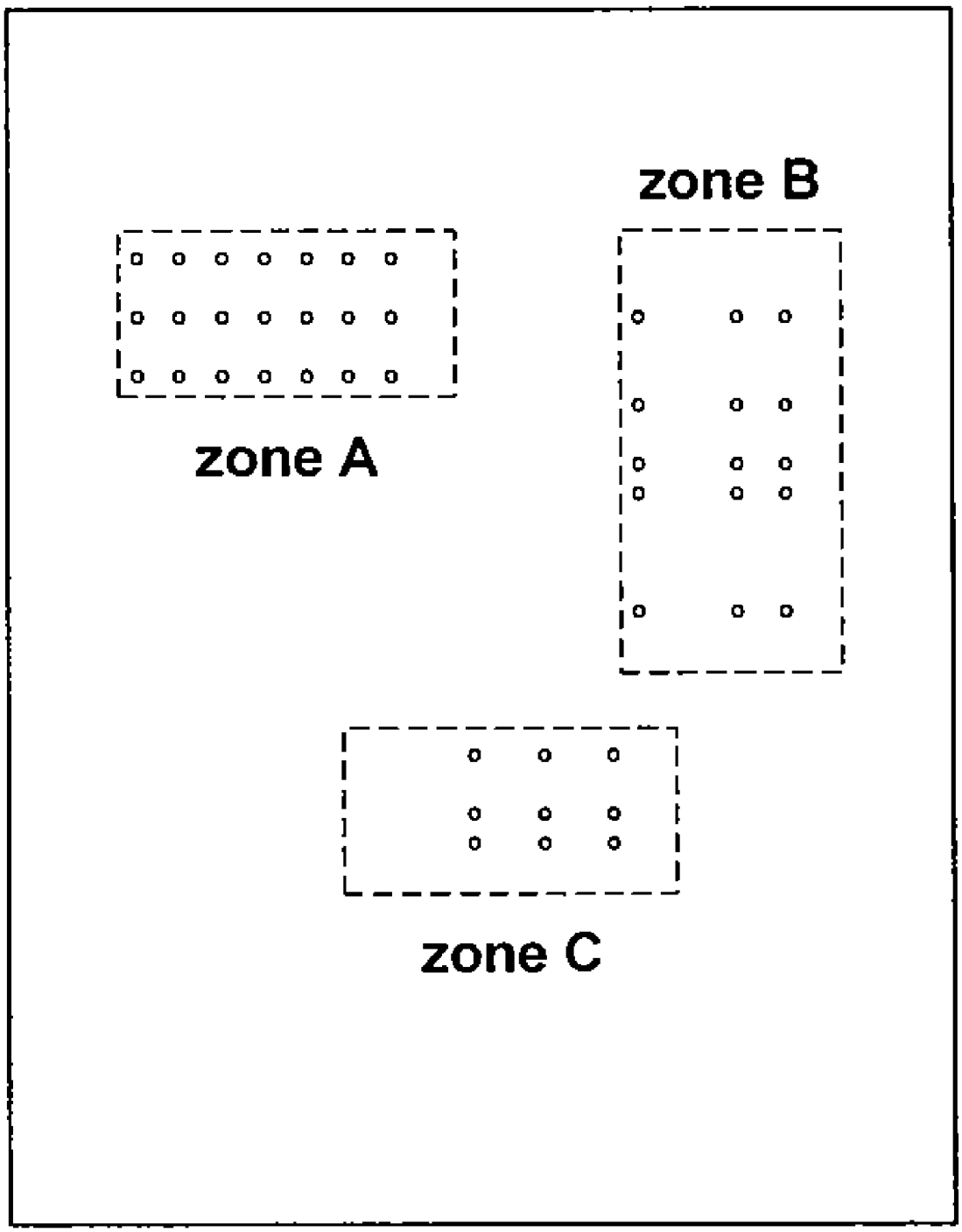

Certain terminology is used herein for convenience only and is not to be taken as a limitation on the present invention. In the drawings, the same reference letters are employed for designating the same elements throughout the several figures.

DEFINITIONS

Figure 10:
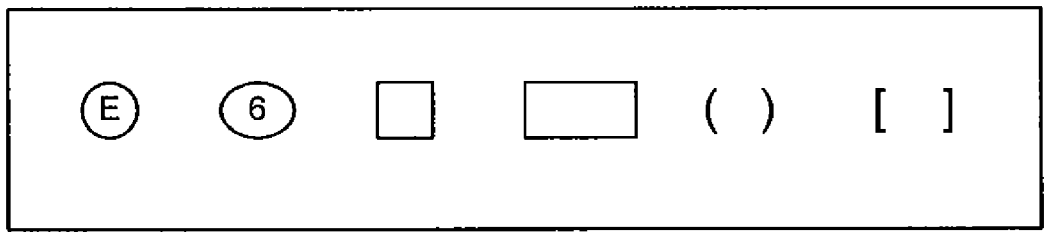
FIG. 10 shows ISR mark-sense response bubbles that can be used in preferred embodiments of the present invention.

The following definitions are provided to promote understanding of the present invention.

response bubble—an enclosed or partially enclosed region on a response form that is intended to be marked or left unmarked. Examples of response bubbles are shown in FIG. 10.

well-formed response bubble—a valid response bubble, whether marked or unmarked, wherein image data of the response bubble conforms to what is expected compared to bubble information of a related form template zone definition.

not well-formed response bubble—an invalid response bubble, whether marked or unmarked, wherein image data of the response bubble does not conform to what is expected compared to bubble information of a related form template zone definition. Examples of not well-formed response bubbles include response bubbles that have been erased, are missing due to whiteout, or were printed improperly due to a printer fault.

marked response bubble—a well-formed or not well-formed response bubble that is determined to be marked.

blank response bubble—a well-formed or not well-formed response bubble that is determined to be unmarked.

erased response bubble—a not well-formed response bubble that shows evidence of erasure of the response bubble. Examples of erasure includes use of white out (whiteout) or aggressive erasure of a marked response bubble that causes an erasure of the marked response, as well as erasure of portions or all of the response bubble.

zone—an area of a response form that contains one or more response bubbles that are to be processed according to information of a related form template zone definition.

well-formed zone—a zone where the zone location confidence level is greater than the zone location threshold level.

zone location confidence level—a measurement of the degree of satisfaction or certainty with the determination of the identification and location of the zone.

zone location threshold level—the minimum zone location confidence level that is satisfactory for the positive determination of the identification and location of the zone.

most well-formed zone—the well-formed zone with the highest zone location confidence level. To be well-formed the level must be above the zone location threshold level.

form template—defines one or more zones of a form and contains data about the zones. Examples of the zone data include location, size and shape of zones and response bubbles in a zone; the spacing between response bubbles and the spacing between zones; and response attributes.

blank response code—a blank response code is an output value for a response bubble that indicates that the response bubble was left unmarked.

erased response code—an erased response code is an output value for a not-well formed response bubble indicating that the response bubble was marked and then erased in some manner such as a by pencil eraser or whiteout.

erasure information—erasure information contains data related to erased response bubbles in form template zones. Such information includes the identified erased response bubbles for a query.

A. The Inferential Self-Registration Procedure

Inferential self-registration uses pattern-recognition techniques more advanced than those used in current plain-paper OMR technology. Not only does it not require special registration marks of any kind, it can infer the locations of not well-formed response bubbles. In addition, it imposes looser constraints on the detection of a response bubble. These advances provide at least the following benefits:

(i) added flexibility in the forms design process,
(ii) a more comprehensive registration process,
(iii) a more powerful recognition process, and
(iv) a broader range of compensating for forms problems, such as poor print quality, poor scan quality, missing response bubbles, and damaged response bubbles.

A1. Forms Design

Inferential self-registration offers greater flexibility in the design of forms. This includes the shapes that may be used for response bubbles, the layout of zones, and the more flexible use of text and images on the form.

(i) Response Bubble Design

With current plain-paper technology, response bubbles must be closed shapes. With inferential self-registration, a response bubble may be any shape that clearly indicates to the user the area that is to be marked. For instance, simple parentheses or brackets may be used, as shown in FIG. 10.

(ii) Zone Design

Figure 11:
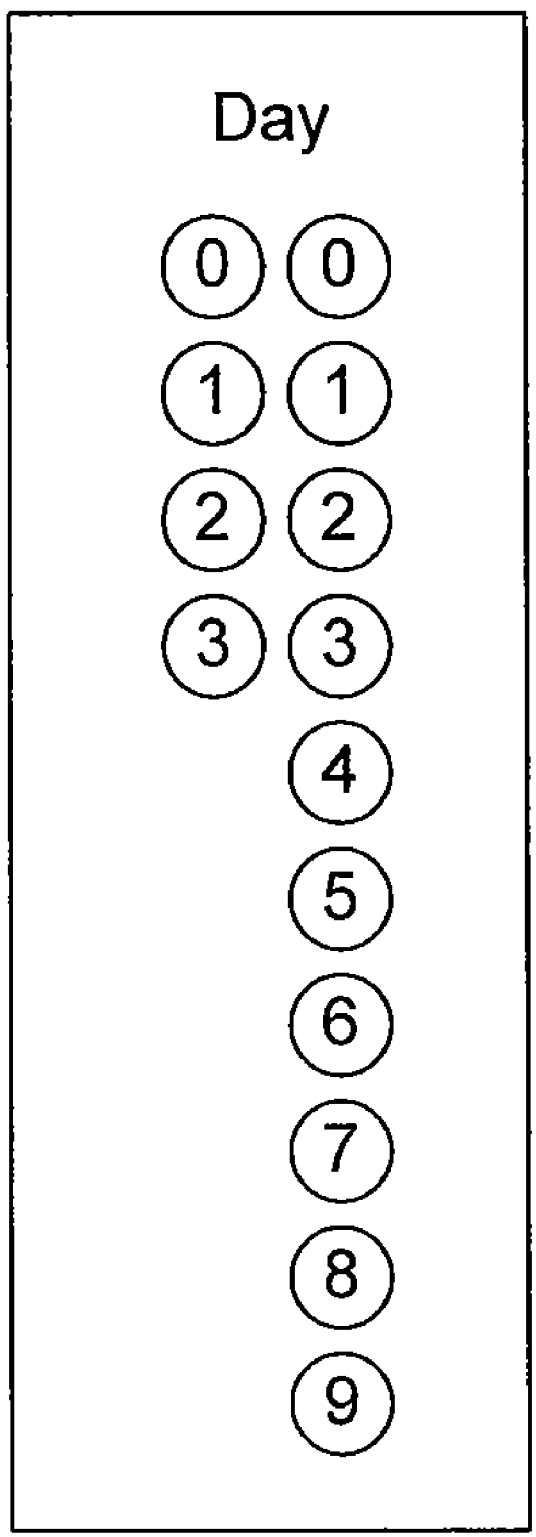

The design of zones, or grids of response bubbles, is more flexible with inferential self-registration since they do not have to be complete. That is, there do not have to be the same number of response bubbles in each row or in each column. For instance, a zone designed for entering the day of the month is shown in FIG. 11. In this zone design, there are four response bubbles in the first column and ten response bubbles in the second column. Since inferential self-registration is insensitive to not well-formed response bubbles, this zone design is appropriate for ISR technology. This zone design would not work in a contemporary plain-paper OMR form because response bubbles (4) through (9) are missing from the first column. Either empty response bubbles would have to be added to column 1 to fill out the zone, or this configuration would have to be defined as two zones (perhaps the first column as one zone and the second column as a second zone).

(iii) Text and Images

With contemporary plain-paper OMR, response bubbles must be well-spaced from text or images so that each response bubble can be reliably scanned independently without encountering any extraneous background printing. Because of the advanced pattern-recognition techniques that it uses, inferential self-registration is able to distinguish response bubbles from this background printing so long as none of the background printing that is close to a response bubble can be confused as a response bubble. For instance, FIG. 12, part (a), shows such a zone with text mixed in with the response bubbles in the zone. In effect, ISR is seeing only the response bubbles in the zone; it ignores any text or images contained in the zone (FIG. 12, part (b)). As described in more detail below, it is not even necessary for all of the response bubbles in this zone to be detected, as shown in FIG. 12, part (c).

A2. Form Registration

The first step in the ISR process of recognizing a marked form is to find a response bubble in an expected location. For instance, the recognition logic may search an area beginning with the top left corner in the top left zone. It searches in this area for a response bubble, as described earlier.

Figure 14:
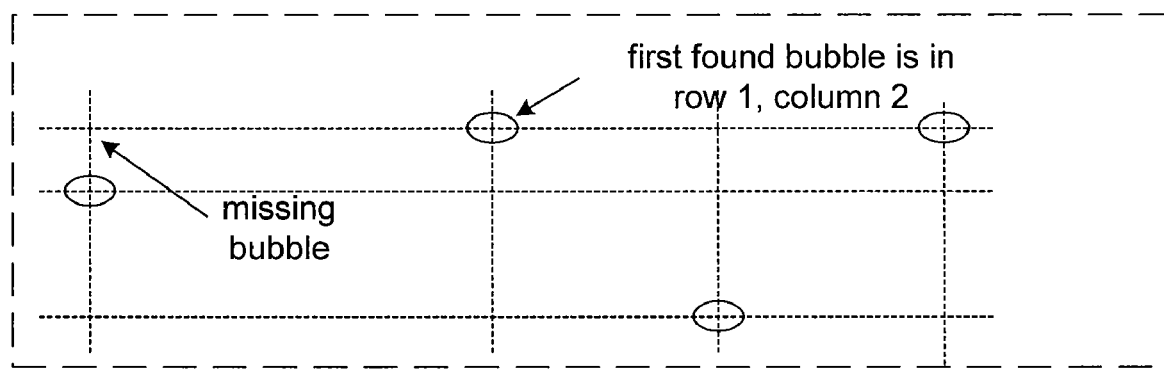

If the search logic finds a response bubble, it does not yet know if this is the upper left-hand response bubble in the zone. It continues to look for other response bubbles vertically and horizontally within the grid. When the entire zone has been searched, the well-formed response bubbles that were found in the zone are compared against the form template information for the zone. Based upon how well the zone conforms to the information in the form template, a zone location confidence level is assigned to the zone. If the zone location confidence level is greater than the preset zone location confidence threshold, then the zone is deemed to be well-formed. FIG. 13 shows several possible examples of well-formed zone. One possible approach would be to consider a zone to be well-formed if there is at least one bubble in each row and each column of the grid (FIG. 14).

The search logic then uses this location information of the well-formed zone as the registration mark for this form. All other response bubble positions on the form can be located using the registration position and the information stored in the form template.

If the search logic does not find an acceptable response bubble group in the first zone, it can then attempt to find an acceptable response bubble group in another zone. If it finds such a response bubble group in another zone, this location is used as the registration mark for the form. If the search logic finds no such response bubble groups in a specified number of zones, the page may be rejected as being unreadable.

A3. Form Processing

Once the form has been registered, it can be processed by determining the marked status of each response bubble. Using the determined registration mark, inferential self-registration uses its response bubble-detection logic to find the response bubbles in a zone grid by positioning each response bubble in the grid according to the dimensions stored in the form template. ISR records the contents of each response bubble as being either marked or unmarked for later reporting. If no response bubble is found in an expected location, ISR will treat it as an unmarked response bubble. This will happen, for instance, if a response bubble has been erased.

Once having processed one zone in this way, inferential self-registration proceeds to process other zones in the same manner until the mark-sense form has been processed.

As it processes a mark-sense form, the inferential self-registration logic continually refines its response bubble-location logic based on what it finds on the form to account for image compression/expansion, skew, and not well-formed response bubbles, as described later.

An alternative technique for form processing is to register the form first, as described above, and then to overlay the template on the form. Using the template overlay, all of the template printing is erased from the form, leaving only the marks. The resulting form then can be simply searched for the marks made by the respondent. When a mark is found, its position on the form identifies the response bubble that was marked. If a mark does not correspond to a response bubble position, it is ignored.

A4. Image Compression/Expansion

The scanned image may be slightly compressed or slightly expanded compared to the template that was used to determine the grid spacing. This could be caused, for instance, by paper deformation (such as due to humidity) or by differences in the scanners used to read the template and to read the marked form.

As each response bubble is found, its center is determined and compared to the template measurement. If the response bubble location varies slightly from the template measurement, a vertical or horizontal compression factor, as appropriate, is calculated and is applied to the entire mark-sense form. For instance, if the response bubble following the registration response bubble is expected to be 0.5 inches away but is found to be 0.505 inches away instead, a compression factor of +1% (0.005/0.5) is applied to further template dimensions.

Using the distance between the registration response bubble and the current response bubble being analyzed, this process continues as further response bubbles are identified, thus continually refining the compression factor. The compression factor becomes more and more accurate as the form is processed and allows response bubbles remote from the registration response bubble to be accurately located even in the presence of image compression or expansion.

A5. Skew

The image may be skewed. Skew occurs when the rows in a grid are not exactly horizontal or when the columns are not exactly vertical. It may be caused, for instance, by the paper feeding mechanism in the printer or in the scanner.

Figure 15:
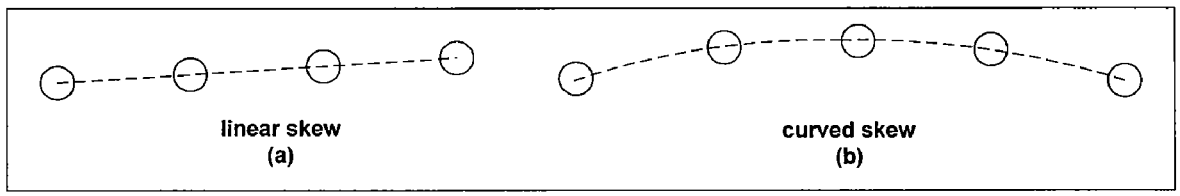

Skew is determined in a similar manner to the determination of compression/expansion, as described above. If a response bubble is above or below its expected position in a row (FIG. 15, part (a)), a skew (slope) factor is determined and is applied to the entire form. For instance, if a response bubble in a row is 2.00 inches from the registration response bubble and is 0.02 inches higher than it should be, a skew factor of +1% (0.02/2.00) is applied to the entire zone. As with the compression factor, the skew factor can be continually tuned as the document is processed. The skew factor can be calculated for both rows and columns. However, there is only one skew factor for the form.

Skew does not have to be a linear function. It can follow a curve (FIG. 15, part (b)). For instance, some scanners scan with a small head that is in one fixed position but is rotated to scan the entire form. These scanners can create a skew such that response bubbles in a row or column follow some curve. In this case, the inferential recognition logic can use a least-squares or similar mathematical technique to determine an appropriate curve that closely matches the measured skew.

A6. Partial or Missing Response Bubbles

Erasures, whiteouts, printer faults, and improper paper handling can cause response bubbles to become unreadable, either because they have been obliterated or because they no longer have the expected shape. With inferential self-registration, the position of these not-well formed response bubbles can be accurately inferred. If no response bubble is found in an expected area of an otherwise proper grid, it can be inferred that an unmarked or erased response bubble occupies that space. Alternatively, the not well-formed response bubble could be reported as a special value. In either event, the recognition process can continue. Conversely, if a response bubble is detected in a position that should not contain a response bubble, that response bubble can be deemed to be erroneous and can be ignored. It is up to the user to specify whether such response bubble determinations are acceptable or whether the zone should be invalidated.

A7. Mismarked Response Bubbles

Figure 16:
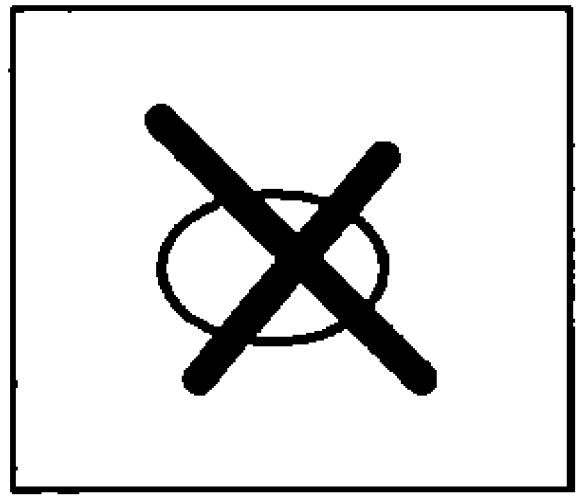

Another common problem is mismarked response bubbles. This occurs when a user mark carries beyond the response bubble boundary (FIG. 16). This may make it difficult to determine that a response bubble actually exists at this position.

With inferential self-registration, it can be determined that a response bubble does, in fact, exist at this location. Starting at the expected center of the response bubble, the pixels making up the response bubble can be determined. It can then be decided if enough pixels within the expected response bubble are marked to qualify the response bubble as being marked.

B. Additional Inferential Self-Registration Strategies

The fact that inferential self-registration uses pattern-recognition techniques opens up a number of other registration strategies.

B1. User-Defined Registration Marks

Though registration marks are not required, the user may design the OMR form with registration marks incorporated into the zones to improve registration accuracy. For instance, FIG. 17, part (a) shows preprinted marked response bubbles that define each row and column within a zone.

Figure 17:
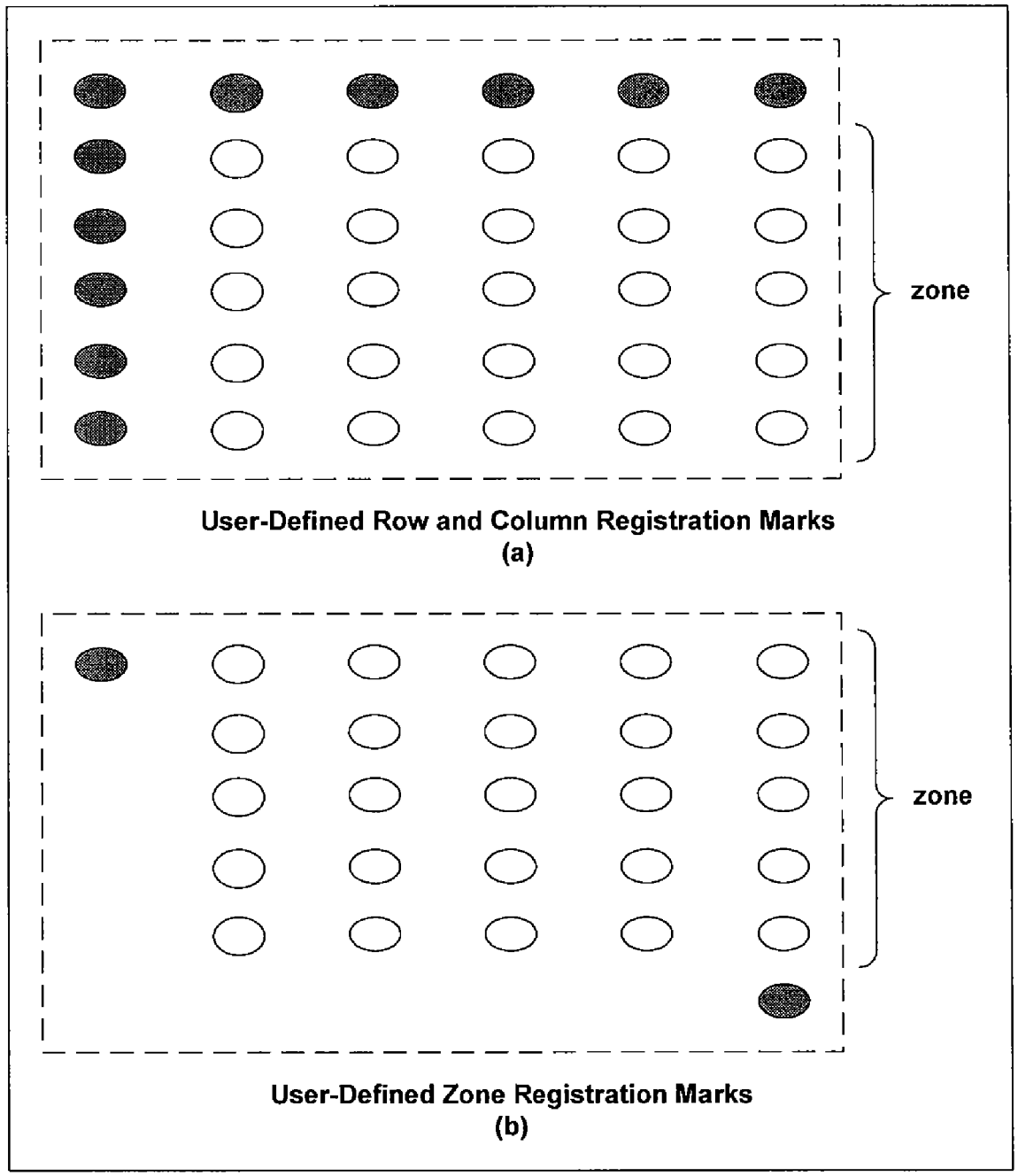

FIG. 17, part (b) illustrates the use of preprinted marked response bubbles to define the boundaries of a zone. The two marked response bubbles in this example can be used to determine the locations of the first row and the last column. From this information, the locations of each column and each row and therefore the location of each response bubble within the zone can be accurately determined.

It is not necessary that the registration response bubbles be preprinted as marked, Rather, the user can be instructed to mark the registration response bubbles as a part of filling out the OMR form.

B2. Registration on a Graphic

Figure 18:
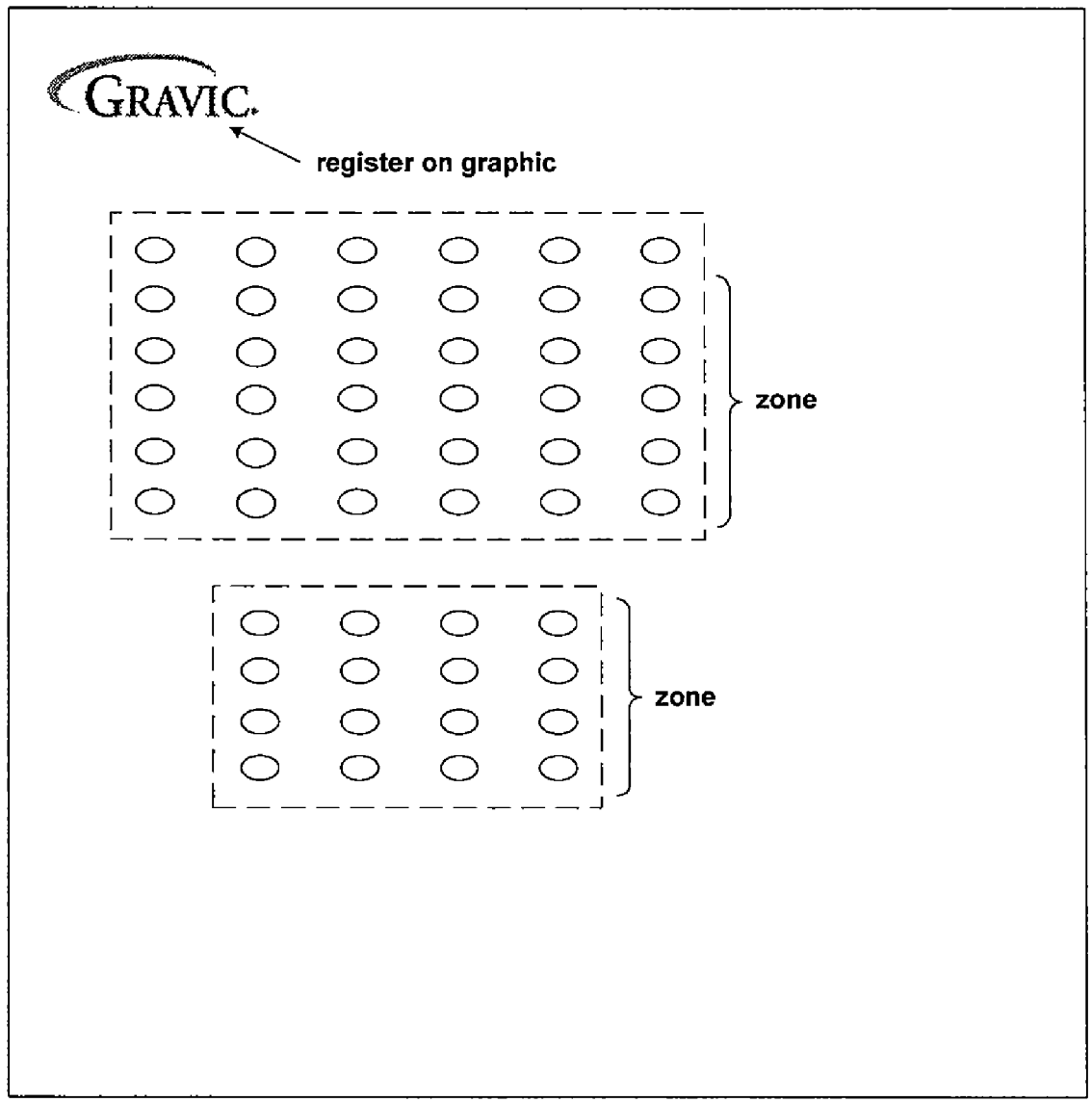

Pattern-recognition techniques can be employed to register on any graphic or text on the form, not just on response bubbles. For instance, FIG. 18 shows registration based on a graphic on the OMR form. Once the graphic has been located, the locations of the zones and of the response bubbles within the zones have been reasonably determined.

B3. Registration on Row and Column Headers

Figure 19:
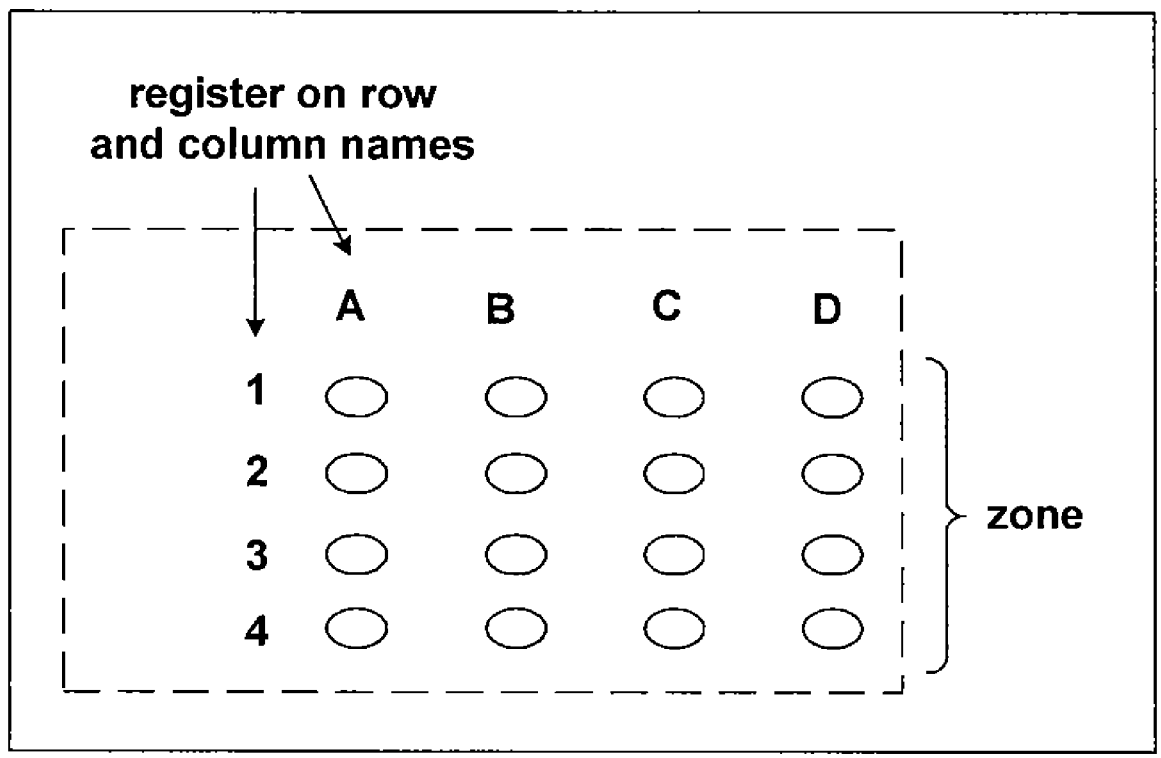

The titles for the rows and columns can be used for registration, as shown in FIG. 19.

B4. Registration on a Form Border

Figure 20:

A border may be printed on the form around the zone or around the form itself and may be used for registration, as shown in FIG. 20.

B5. Augmented Self-Registration

Any combination of the above may be used for registration. For instance, a coarse registration may be determined by registering on a graphic or specific text somewhere on the page. Then the row and column titles in each zone may be used as a fine registration.

C. Invalid or Erased Response Reporting Capabilities

Figure 21:
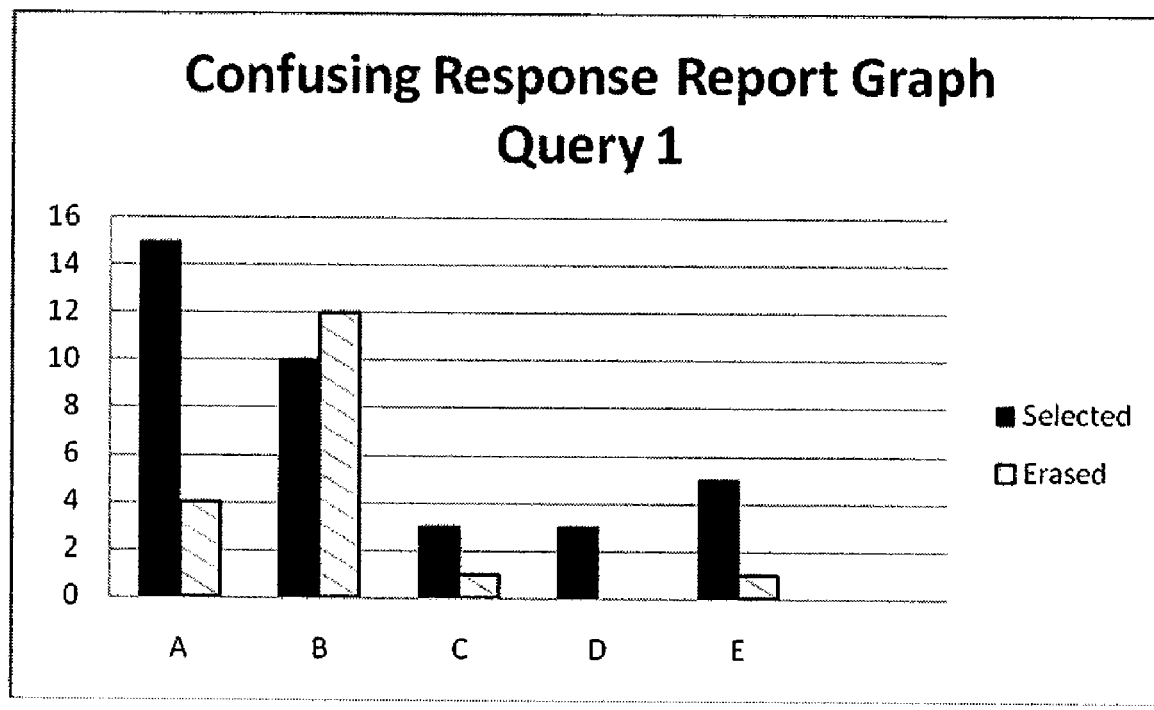
FIG. 21 shows a sample confusing response report graph in accordance with one preferred embodiment of the present invention.
Figure 22:
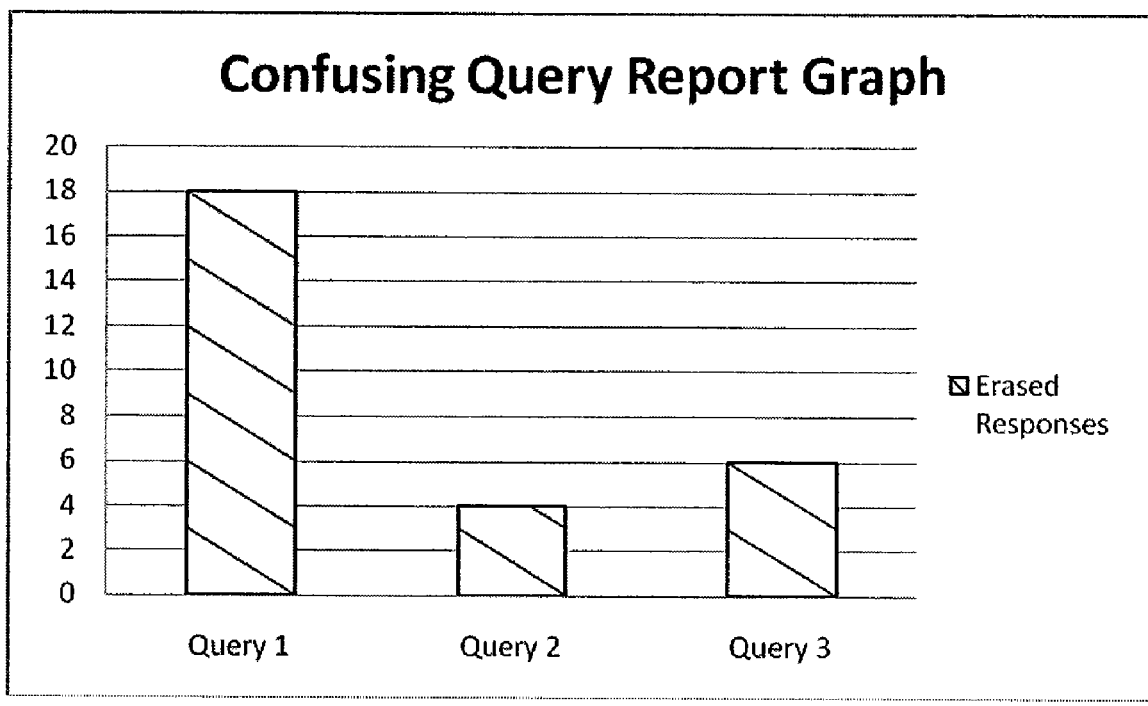
FIG. 22 shows a sample confusing query report graph in accordance with one preferred embodiment of the present invention.

By being able to identify, locate and process erased or partially formed mark-sense response bubbles, an additional "erased" response code can be assigned for reporting purposes to a processed response bubble that was not well-formed. This attribute can help track whether or not a response option was often selected initially but then erased for another selection, and can be used in a number of different reports. For example, when doing item analysis, a report could be generated tallying and graphing the erased responses for any given query (FIG. 21), offering a look at which responses were most often erased. In addition, a report could be generated tallying and graphing the total erased responses for all the queries on a form (FIG. 22), offering a look at which questions in general most often had erased responses. These reports could have such applications as helping to determine if a correct answer is really correct, if an answer option is confusing, if a question in general is confusing, if an answer option is misleading, if respondents' first answers were correct or incorrect one, if a particular question may have been answered correctly but still confusing to respondents, or if a question may have more than one correct answer.

D. Advances over Traditional OMR Technology

Plain-paper OMR technology allows users to use normal data-processing facilities to prepare and accurately read mark-sense forms. This includes the use of standard word processing or graphic programs to design the mark-sense forms, standard printers to print the forms on standard paper, the use of any pencil or pen to mark the response bubbles, and standard scanners to read the forms.

Inferential self-registration extends the processing capabilities of plain-paper OMR to provide additional savings and benefits to the user. Building on the current state of the plain-paper OMR art, ISR provides many benefits that are not typically found in traditional OMR systems or contemporary plain-paper OMR systems.

D1. Benefits of Contemporary Plain-Paper OMR Over Traditional OMR Technology

The advent of plain-paper OMR provides many advantages over traditional OMR, including at least the following:
1. Mark-sense forms can be created with any commercially available word processing or graphics package.
2. Mark-sense forms can be printed on any printer of reasonable quality.
3. Mark-sense forms reproduced on a copying machine from an unmarked template can be used.
4. Special "drop-out" colors that are transparent to the image scanner do not have to be used. The entire form can be printed in black.
5. Mark-sense forms can be read with any quality, commercially available image scanner.
6. Marks made by any pencil or pen can be read, provided that the mark is dark enough.
7. Registration marks are not necessary. Registration can be made based on the recognition and locations of zones of response bubbles.
8. Since there is no need for preprinted registration marks, there is less wasted space on the OMR forms for these marks.
9. Compensation for image compression or expansion can be automatically provided.
10. Compensation for image skew, whether that skew is linear or curved, can be automatically provided.

D2. Inferential Self-Registration Innovative Advances

The preceding list of benefits is augmented by inferential self-registration, which compensates for not well-formed response bubbles. Response bubbles may be not well-formed for many reasons, such as form design, erasures, whiteouts, poor paper handling, and printer faults. Inferential self-registration brings at least the following benefits to current plain-paper technology:

1. Inferential self-registration can find the data if part of the registration information is missing.
2. Even if an entire row or column is missing, registration can be made on another zone.
3. Inferential self-registration can recognize damaged or partially formed mark-sense response bubbles and can determine their locations.
4. The locations of not well-formed mark-sense response bubbles is determined by inference.
5. Inferential self-registration can handle improperly marked mark-sense response bubbles.
6. Inferential self-registration will search a zone and will look for response bubbles. It will ignore any text or graphics that it determines is not a response bubble.
7. Text and images may both be contained within a mark-sense zone so long as the design of the response bubble is such as to distinguish it from any text surrounding it.
8. Inferential self-registration can use other items for registration, such as user-defined response bubbles, graphics, row and column titles, and borders.
9. Zone definitions no longer require the same number of response bubbles in each column and row.

Based on the discussions above, various embodiments of ISR can be implemented.

In a first embodiment, image data of a zone in a response form that has a plurality of response bubbles in the zone is processed. The image data of the zone has at least one response bubble that is well-formed and at least one response bubble that is not well-formed. This embodiment operates as follows:
1. Well-formed response bubbles are located in the zone from image data of the zone.
2. The locations of the well-formed response bubbles in the zone are compared to a form template that defines the zone and contains data regarding locations of all expected response bubbles in the zone.
3. It is determined from the comparison whether sufficient information exists to determine that the well-formed response bubbles constitute a specific part of the form template zone.
4. If sufficient information exists to determine that the well-formed response bubbles constitute a specific part of the form template zone, then the well-formed response bubbles are processed from the image data of the zone.

In addition, if sufficient information exists to determine that the well-formed response bubbles constitute a specific part of the form template zone, the locations of at least one response bubble that is not well-formed are inferred. The "not well-formed response bubbles" from the image data of the zone are then processed, such as by being assigned a blank response code or an erased response code.

Furthermore, if sufficient information exists to determine that the well-formed response bubbles constitute a specific part of the form template zone, the locations of the well-formed response bubbles may be used to identify locations of response bubbles in other zones in the response form.

Figure 23:
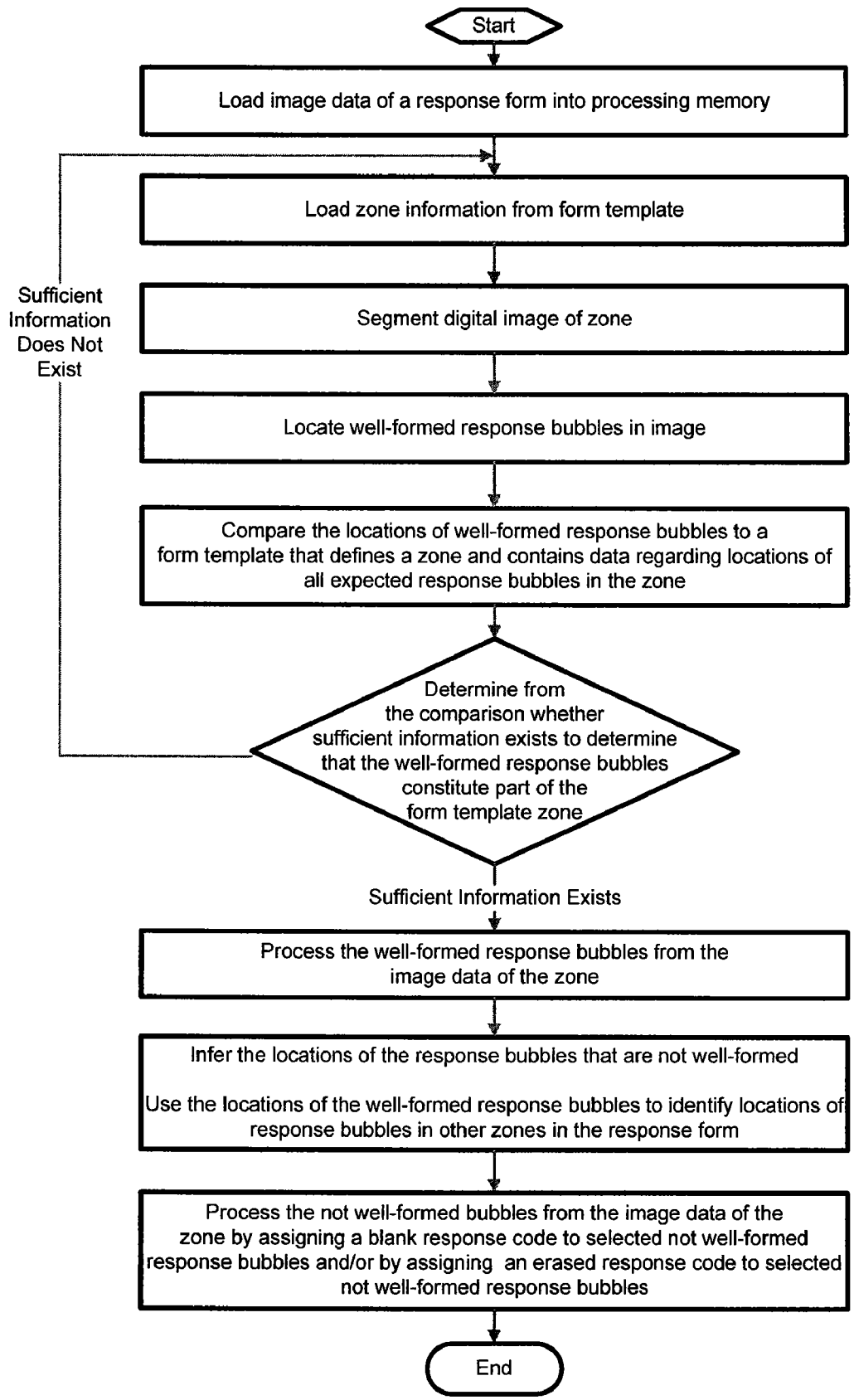
FIGS. 23-26 show flowcharts of processes in accordance with preferred embodiments of the present invention.

FIG. 23 shows a flowchart of the first embodiment.

In a second embodiment, image data of zones in a response form that has a plurality of zones within the form is processed. The image data of the response form has at least one zone including at least one response bubble that is well-formed and at least one zone including at least one response bubble that is not well-formed. This embodiment operates as follows:
1. Well-formed response bubbles are located in one or more zones from the image data of the form.
2. The locations of well-formed response bubbles in the one or more zones are compared to a form template that defines one or more zones and contains data regarding locations of all expected response bubbles in the zones.

3. It is determined from the comparison whether sufficient information exists to determine that one or more well-formed response bubbles constitute specific parts of one or more specific form template zones.
4. If sufficient information exists to determine that the one or more well-formed response bubbles constitute specific parts of one or more specific form template zones, then the locations of the one or more well-formed response bubbles are used to identify the locations of remaining response bubbles in zones of the response form, and well-formed response bubbles are processed in the zones from the image data of the response form.

In addition, if sufficient information exists to determine that the one or more well-formed response bubbles constitute specific parts of one or more specific form template zones, the locations of at least one not well-formed response bubble in at least one zone are inferred, and the not well-formed response bubbles are processed in the at least one zone from the image data of the form. Selected "not well-formed response bubbles" may be assigned a blank response code or an erased response code.

Furthermore, the first step in the process may be performed by locating well-formed response bubbles in a first zone from the image data of the form, and if sufficient information exists to determine that the one or more well-formed response bubbles constitute specific parts of the first zone, then the fourth step in the process may be performed by using the locations of the one or more well-formed response bubbles to identify the locations of remaining response bubbles in a second zone of the response form, and then processing well-formed response bubbles in the second zone from the image data of the form.

Figure 24:
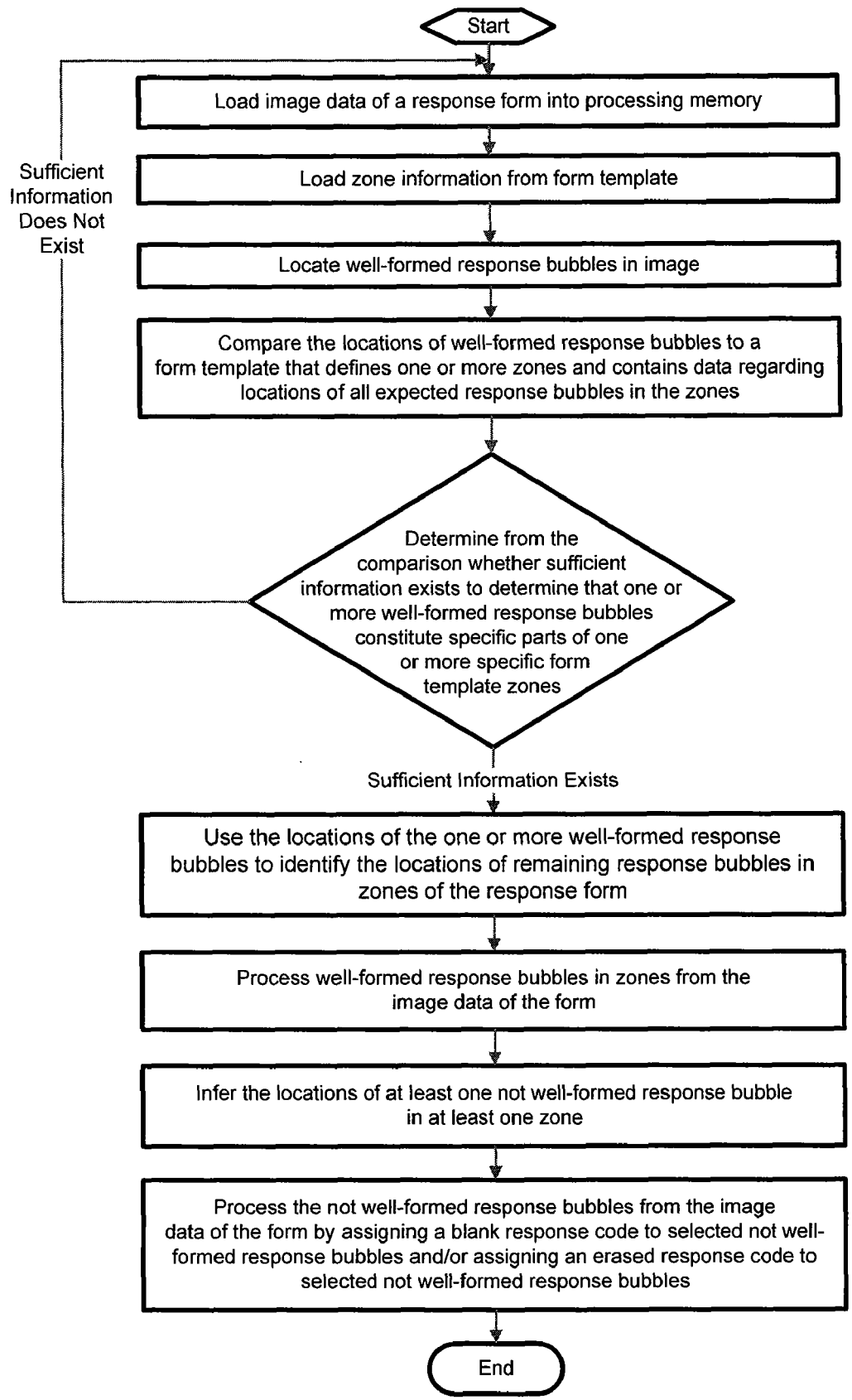

FIG. 24 shows a flowchart of the second embodiment.

In a third embodiment, image data of zones in a response form that has a plurality of zones within the form is processed. Each zone includes at least one response bubble. This embodiment operates as follows:

1. Image data of a plurality of zones within the form are examined.
2. A well-formed zone is identified. The identified well-formed zone may be the first well-formed zone that is identified, or it may be the most well-formed zone that is identified from the plurality of zones that are examined. In one version of this embodiment, the well-formed zone is a zone wherein all of the response bubbles in the zone are well-formed.
3. Information about the identified well-formed zone is stored. The stored information includes the location of the well-formed zone.
4. Image data of at least one other zone is processed based on the information of the well-formed zone.

Figure 25:
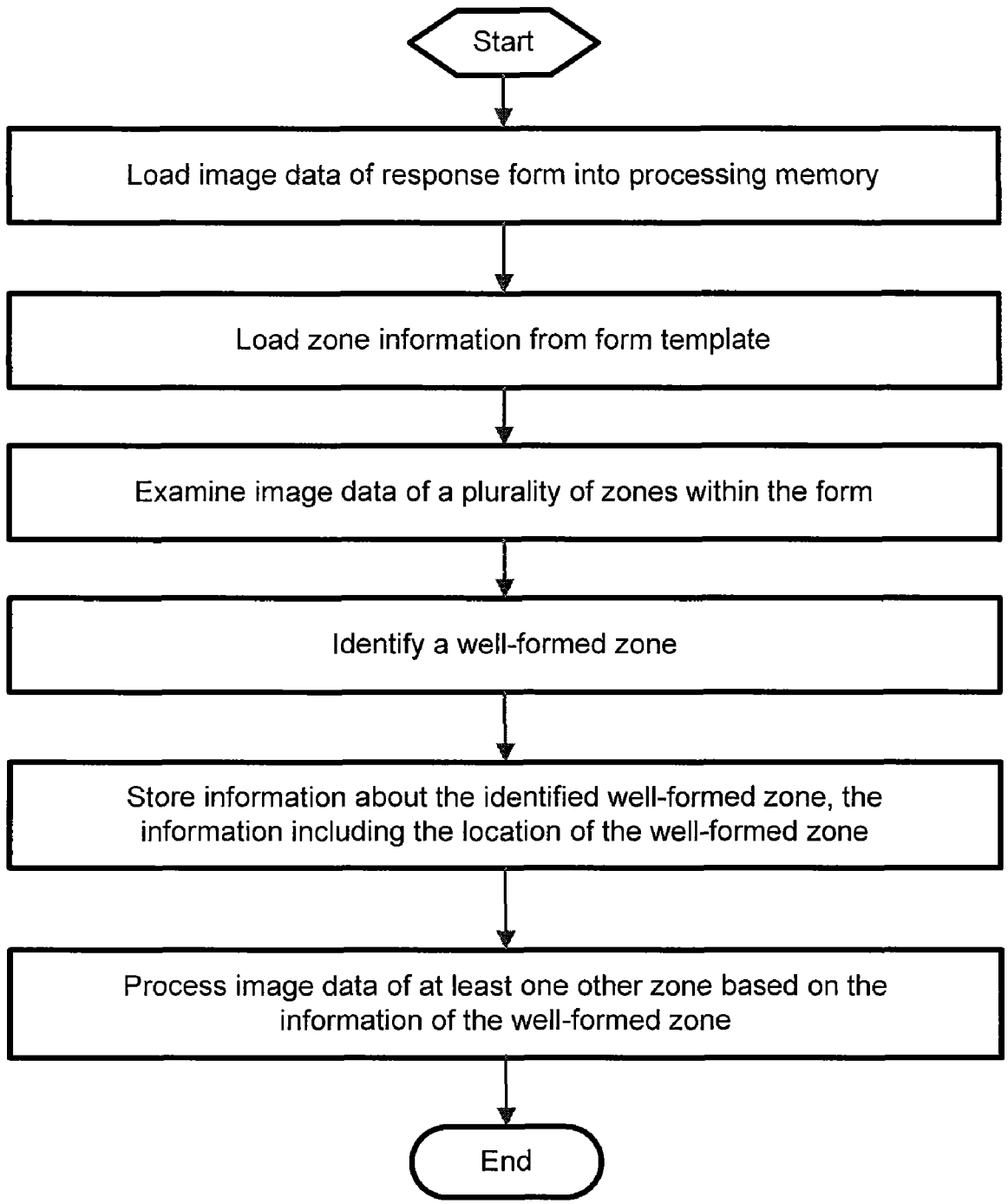

FIG. 25 shows a flowchart of the third embodiment.

In a fourth embodiment, erasure information for one or more queries is identified and stored. Each query includes a plurality of response bubbles related to the respective query. This embodiment operates as follows:

1. Any erased response bubbles in the plurality of response bubbles related to a common query are automatically identified. The identified erased response bubbles are the erasure information.
2. The erasure information is electronically stored to a computer memory.
3. A report is automatically generated showing the electronically stored erasure information. The report may show the electronically stored erasure information for each of the plurality of response bubbles related to a respective query, thereby conveying the response bubble that had the most erasures. The report may also show a tally of the electronically stored erasure information for the plurality of response bubbles related to a respective query. The report may also show a tally of the electronically stored erasure information for each of the queries, thereby conveying the query that had the most erasures.

Figure 26:
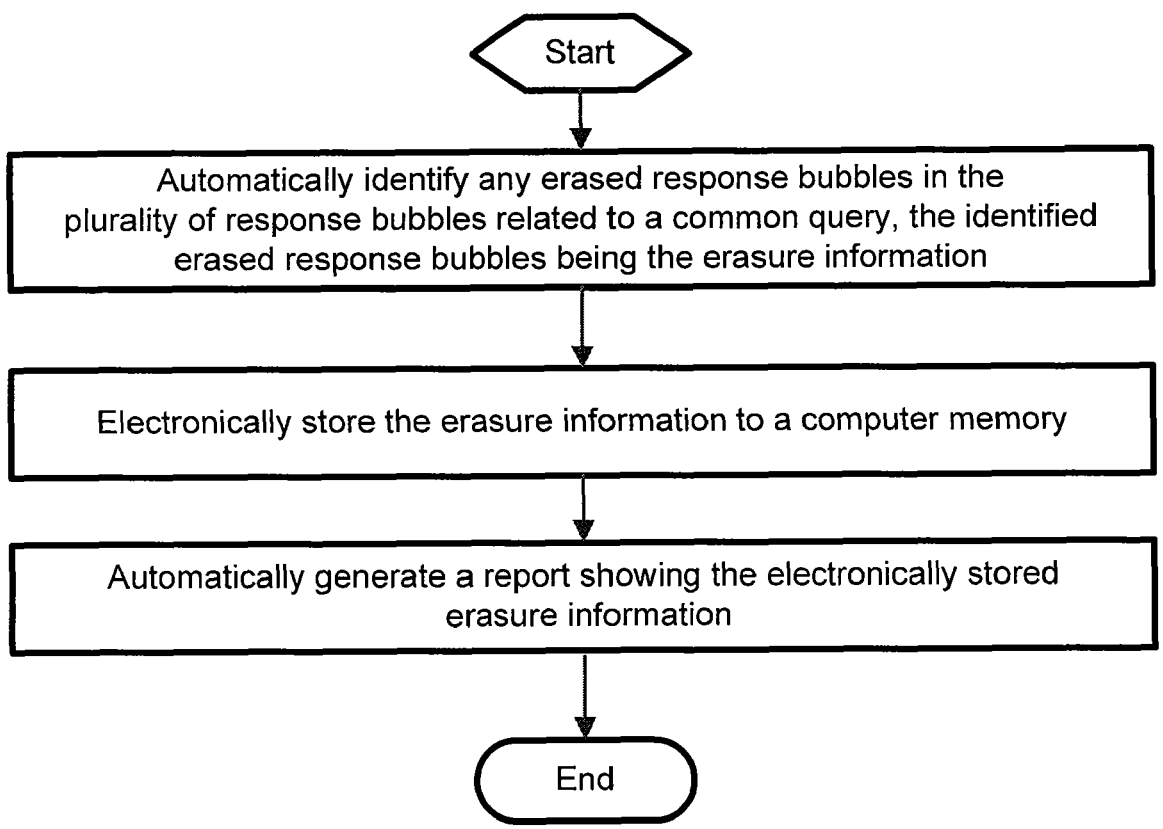

FIG. 26 shows a flowchart of the fourth embodiment.

Figure 27:
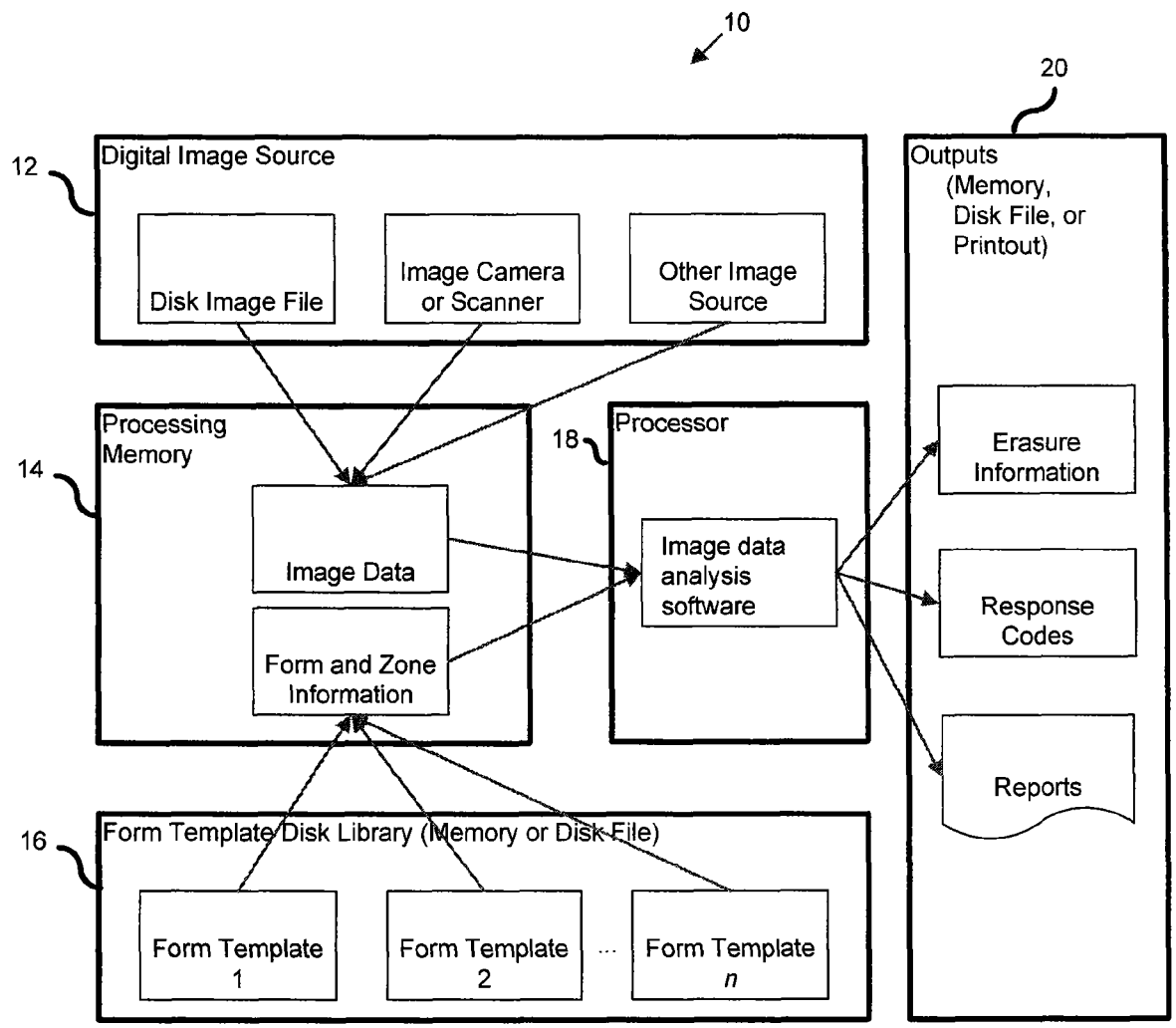
FIG. 27 shows a schematic block diagram of a system for implementing one preferred embodiment of the present invention.

FIG. 27 shows a schematic block diagram of a system (apparatus) 10 for implementing one preferred embodiment of the present invention. The system 10 includes a digital image source 12, processing memory 14, a form template disk library 16, a processor 18 and outputs 20. The digital image source 12 may be a disk image file, an image camera or scanner, or other image source. The processing memory 14 receives and stores image data from the digital image source 12, and form and zone information from the form template disk library 16. The form template disk library 16 includes a plurality of form templates. The processor 18 receives the image data and the form and zone information from the processing memory 14 and performs image analysis using image data analysis software, such as a version of Remark Office OMR upgraded to implement the above-described ISR features, or as a new software product. The processor 18 may be any general-purpose computer, such as a personal computer (PC) that runs a Microsoft Windows® operating system or a mainframe computer running a UNIX-type operating system. As discussed above, the processor 18 provides various types of outputs, such as erasure information, response codes and reports.

Figure 28A:
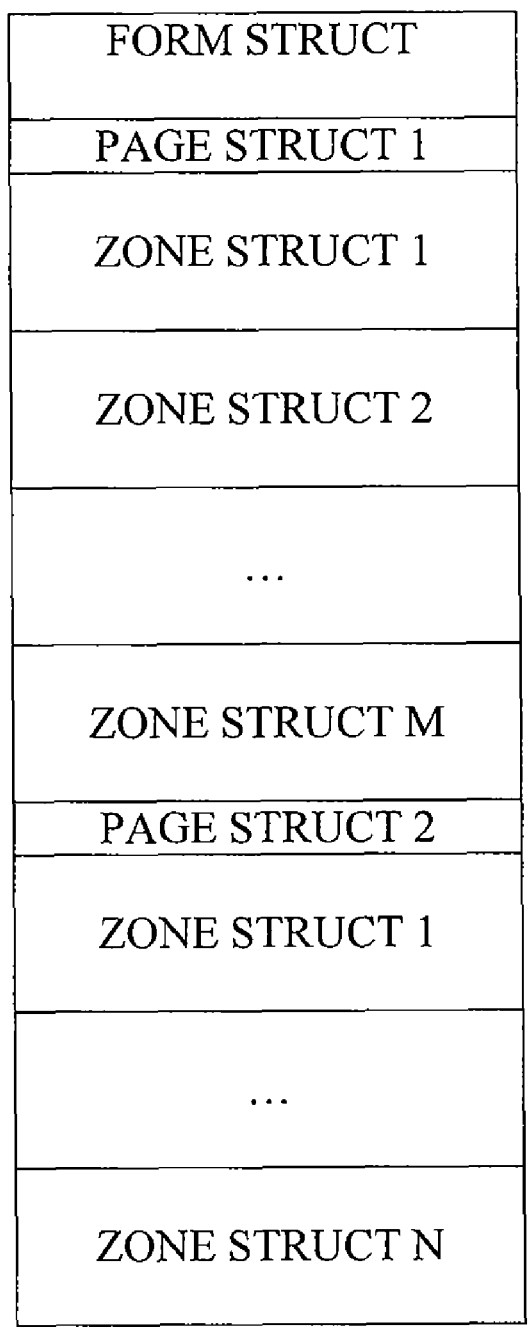

FIGS. 28A-28E shows an example of a form template format used in Remark Office OMR. There are three structures that make up a form template file. For each form there is one form structure, for each page there is one page structure, and for each zone on the page there is one zone structure. There is also a join structure to group joined zones together. In general, the template file is arranged as described in FIG. 28A. The Form Structure, relevant fields of which are shown in FIG. 28B, is the first structure found in the template. The form structure holds information that pertains to the entire form. This information includes information on the amount of data in the template, and information about the physical pages being read. The main function of the Page Structure, relevant fields of which are shown in FIG. 28C, is to define the page breaks when parsing the template. Each page structure contains the number of zones and items for this particular page. Remark Office OMR allows zones to be logically joined together to form one single zone. The Join Structure, relevant fields of which are shown in FIG. 28D, denote the beginning of a set of joined zones. Each Zone Structure, relevant fields of which are shown in FIG. 28E, contains important information for ISR about the zone and its response bubbles. Although this example is described with respect to Remark Office OMR, the structure may be used in other image data analysis software.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of processing image data of a zone in a response form that has a plurality of response bubbles in the zone, wherein image data of the zone has (i) at least one response bubble that is well-formed, and (ii) at least one response bubble that is not well-formed, the method comprising:
   (a) locating well-formed response bubbles in the zone from the image data of the zone;
   (b) comparing the locations of the well-formed response bubbles in the zone to corresponding locations in a form template that defines the zone and contains data regarding locations of all expected response bubbles in the zone;
   (c) determining from the comparison whether sufficient information exists to determine that the well-formed response bubbles constitute a specific part of the form template zone;
   (d) processing the well-formed response bubbles from the image data of the zone if sufficient information exists to determine that the well-formed response bubbles constitute a specific part of the form template zone, wherein the processing includes determining a marked status for each of the well-formed response bubbles;
   (e) using the locations of the well-formed response bubbles to infer the locations of the one or more response bubbles that are not well-formed if sufficient information exists to determine that the well-formed response bubbles constitute part of the form template zone; and
   (f) processing the not well-formed response bubbles from the image data of the zone, wherein the processing includes determining a marked status for each of the not well-formed response bubbles,
   wherein the steps (a)-(f) are performed by a processor.

2. The method of claim 1 wherein step (f) further comprises assigning a blank response code to selected not well-formed response bubbles.

3. The method of claim 1 wherein step (f) further comprises assigning an erased response code to selected not well-formed response bubbles.

4. The method of claim 1 further comprising:
   (g) using the locations of the well-formed response bubbles to identify locations of response bubbles in other zones in the response form if sufficient information exists to determine that the well-formed response bubbles constitute a specific part of the form template zone.

5. The method of claim 1 further comprising identifying and storing erasure information for one or more queries, each query including a plurality of response bubbles related to the respective query, wherein the processing in step (f) further comprises:
   (i) automatically identifying any not well-formed response bubbles that show evidence of erasure in the plurality of response bubbles related to a common query, the identified not well-formed response bubbles that show evidence of erasure being the erasure information; and
   (ii) electronically storing the erasure information to a computer memory.

6. The method of claim 5 wherein the processing in step (f) further comprises:
   (iii) automatically generating a report showing the electronically stored erasure information.

7. The method of claim 5 wherein the processing in step (f) further comprises:
   (iii) automatically generating a report that shows the electronically stored erasure information for each of the plurality of response bubbles related to a respective query, the report thereby conveying the response bubble that had the most erasures.

8. The method of claim 5 wherein the processing in step (f) further comprises:
   (iii) automatically generating a report that shows a tally of the electronically stored erasure information for the plurality of response bubbles related to a respective query.

9. The method of claim 5 where there are a plurality of queries, and wherein the processing in step (f) further comprises:
   (iii) automatically generating a report that shows a tally of the electronically stored erasure information for each of the queries, the report thereby conveying the query that had the most erasures.

10. A method of processing image data of zones in a response form that has a plurality of zones within the form, wherein image data of the response form has (i) at least one zone including at least one response bubble that is well-formed, and (ii) at least one zone including at least one response bubble that is not well-formed, the method comprising:
    (a) locating well-formed response bubbles in one or more zones from the image data of the form;
    (b) comparing the locations of well-formed response bubbles in the one or more zones to corresponding locations in a form template that defines one or more zones and contains data regarding locations of all expected response bubbles in the zones;
    (c) determining from the comparison whether sufficient information exists to determine that one or more well-formed response bubbles constitute specific parts of one or more specific form template zones;
    (d) using the locations of the one or more well-formed response bubbles to identify the locations of remaining response bubbles in zones of the response form if sufficient information exists to determine that the one or more well-formed response bubbles constitute specific parts of one or more specific form template zones;
    (e) processing well-formed response bubbles in zones from the image data of the response form if sufficient information exists to determine that the one or more well-formed response bubbles constitute specific parts of one or more specific form template zones, wherein the processing includes determining a marked status for each of the well-formed response bubbles;
    (f) using the locations of the well-formed response bubbles to infer the locations of the one or more not well-formed response bubbles in at least one zone if sufficient information exists to determine that the one or more well-formed response bubbles constitute specific parts of one or more specific form template zones; and
    (g) processing the not well-formed response bubbles in the at least one zone from the image data of the form, wherein the processing includes determining a marked status for each of the not well-formed response bubbles,
    wherein the steps (a)-(g) are performed by a processor.

11. The method of claim 10 wherein step (g) further comprises assigning a blank response code to selected not well-formed response bubbles.

12. The method of claim 10 wherein step (g) further comprises assigning an erased response code to selected not well-formed response bubbles.

13. The method of claim 10 wherein step (a) further comprises locating well-formed response bubbles in a first zone from the image data of the form, and step (d) further comprises using the locations of the one or more well-formed response bubbles to identify the locations of remaining response bubbles in a second zone of the response form if sufficient information exists to determine that the one or more well-formed response bubbles constitute specific parts of the first zone, and step (e) further comprises processing well-formed response bubbles in the second zone from the image data of the form if sufficient information exists to determine that the one or more well-formed response bubbles constitute specific parts of the first zone.

* * * * *